(12) United States Patent
Hayden et al.

(10) Patent No.: US 9,330,188 B1
(45) Date of Patent: May 3, 2016

(54) SHARED BROWSING SESSIONS

(75) Inventors: Andrew Hayden, Seattle, WA (US);
Peter N. DeSantis, Seattle, WA (US);
Brett R. Taylor, Bainbridge Island, WA (US); Jonathan A. Jenkins, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 215 days.

(21) Appl. No.: 13/335,843

(22) Filed: Dec. 22, 2011

(51) Int. Cl.
*G06F 15/16* (2006.01)
*G06F 17/30* (2006.01)
*G06Q 10/10* (2012.01)
*H04L 29/06* (2006.01)

(52) U.S. Cl.
CPC .... *G06F 17/30873* (2013.01); *G06F 17/30876* (2013.01); *G06Q 10/10* (2013.01); *H04L 29/06* (2013.01)

(58) Field of Classification Search
CPC .............. G06F 17/30873; G06F 17/30876; G06Q 10/10; H04L 29/06; H04L 29/08072; H04L 12/581; H04L 29/06027
USPC ................... 709/204, 203, 248, 227, 228
See application file for complete search history.

(56) References Cited

U.S. PATENT DOCUMENTS

| | | | |
|---|---|---|---|
| 5,634,064 A | | 5/1997 | Warnock et al. |
| 5,809,250 A | * | 9/1998 | Kisor ........................... 709/227 |
| 5,872,850 A | | 2/1999 | Klein et al. |
| 5,930,752 A | | 7/1999 | Kawaguchi et al. |
| 5,961,593 A | | 10/1999 | Gabber et al. |
| 6,049,812 A | | 4/2000 | Bertram et al. |
| 6,084,582 A | | 7/2000 | Qureshi et al. |
| 6,108,637 A | | 8/2000 | Blumenau |
| 6,138,156 A | | 10/2000 | Fletcher et al. |
| 6,144,991 A | | 11/2000 | England |
| 6,182,133 B1 | | 1/2001 | Horvitz |
| 6,195,679 B1 | | 2/2001 | Bauersfeld et al. |
| 6,230,266 B1 | | 5/2001 | Perlman et al. |
| 6,282,542 B1 | | 8/2001 | Carneal et al. |
| 6,356,934 B1 | * | 3/2002 | Delph ........................... 709/204 |
| 6,360,366 B1 | | 3/2002 | Heath |
| 6,397,253 B1 | | 5/2002 | Quinlan et al. |

(Continued)

FOREIGN PATENT DOCUMENTS

| | | |
|---|---|---|
| WO | WO 2013/003631 A2 | 1/2013 |
| WO | WO 2013/049025 A1 | 4/2013 |

OTHER PUBLICATIONS

Bango, Rey, "How JS & Ajax work in Opera Mini 4", Nov. 2, 2007, XP055050107, Retrieved from the Internet.

(Continued)

*Primary Examiner* — Joon H Hwang
*Assistant Examiner* — Abdulkader M Alriyashi
(74) *Attorney, Agent, or Firm* — Knobbe Martens Olson & Bear LLP

(57) ABSTRACT

The generation and management of shared session information between the client computing device and the network computing provider are provided. The shared session information can correspond to a specification of a set of network resources accessed by the client computing device and the preservation of browse session information associated with the previous access of the set of network resources. The shared session information is utilized by one or more client computing devices to access and recreate a browse session corresponding to the set of network resources.

24 Claims, 13 Drawing Sheets

(56) References Cited

U.S. PATENT DOCUMENTS

| | | |
|---|---|---|
| 6,411,966 B1 | 6/2002 | Kwan et al. |
| 6,430,624 B1 | 8/2002 | Jamtgaard et al. |
| 6,438,597 B1 | 8/2002 | Mosberger et al. |
| 6,513,061 B1 | 1/2003 | Ebata et al. |
| 6,549,941 B1 | 4/2003 | Jaquith et al. |
| 6,560,620 B1 | 5/2003 | Ching |
| 6,560,705 B1 | 5/2003 | Perlman et al. |
| 6,625,624 B1 | 9/2003 | Chen et al. |
| 6,633,316 B1 | 10/2003 | Maddalozzo et al. |
| 6,691,106 B1 | 2/2004 | Sathyanarayan |
| 6,704,024 B2 | 3/2004 | Robotham et al. |
| 6,704,204 B1 | 3/2004 | Eskildsen et al. |
| 6,725,269 B1 | 4/2004 | Megiddo |
| 6,728,763 B1 | 4/2004 | Chen |
| 6,785,864 B1 | 8/2004 | Te et al. |
| 6,842,777 B1 | 1/2005 | Tuli |
| 6,871,213 B1 | 3/2005 | Graham et al. |
| 6,871,236 B2 | 3/2005 | Fishman et al. |
| 6,931,439 B1 | 8/2005 | Hanmann et al. |
| 6,944,665 B2 | 9/2005 | Brown et al. |
| 6,963,850 B1 | 11/2005 | Bezos et al. |
| 6,976,059 B1 | 12/2005 | Rogalski et al. |
| 7,003,442 B1 | 2/2006 | Tsuda |
| 7,013,310 B2 | 3/2006 | Messing et al. |
| 7,051,084 B1 | 5/2006 | Hayton et al. |
| 7,054,952 B1 | 5/2006 | Schwerdtfeger et al. |
| 7,082,476 B1 | 7/2006 | Cohen et al. |
| 7,085,736 B2 | 8/2006 | Keezer et al. |
| 7,085,753 B2 | 8/2006 | Weiss et al. |
| 7,089,316 B2 | 8/2006 | Andersen et al. |
| 7,127,473 B2 | 10/2006 | Agassi et al. |
| 7,133,846 B1 | 11/2006 | Ginter et al. |
| 7,159,023 B2 | 1/2007 | Tufts |
| 7,171,478 B2 | 1/2007 | Lueckhoff et al. |
| 7,191,211 B2 | 3/2007 | Tuli |
| 7,219,136 B1 | 5/2007 | Danner et al. |
| 7,260,841 B2 | 8/2007 | Tenereillo |
| 7,274,775 B1 | 9/2007 | Zavaliagk |
| 7,353,252 B1 | 4/2008 | Yang et al. |
| 7,373,313 B1 | 5/2008 | Kahle et al. |
| 7,409,719 B2 | 8/2008 | Armstrong et al. |
| 7,426,750 B2 | 9/2008 | Cooper et al. |
| 7,441,045 B2 | 10/2008 | Skene et al. |
| 7,444,337 B2 | 10/2008 | Zhou et al. |
| 7,448,079 B2 | 11/2008 | Tremain |
| 7,483,983 B1 | 1/2009 | Bonefas et al. |
| 7,484,089 B1 | 1/2009 | Kogen et al. |
| 7,509,397 B1 | 3/2009 | Totty et al. |
| 7,543,059 B2 | 6/2009 | Johnson et al. |
| 7,552,172 B2 | 6/2009 | Corboy et al. |
| 7,565,425 B2 | 7/2009 | Van Vleet et al. |
| 7,599,851 B2 | 10/2009 | Frengut et al. |
| 7,610,382 B1 | 10/2009 | Siegel |
| 7,624,047 B1 | 11/2009 | Round |
| 7,653,544 B2 | 1/2010 | Bradley et al. |
| 7,730,352 B2 | 6/2010 | Marquard et al. |
| 7,792,944 B2 | 9/2010 | DeSantis et al. |
| 7,797,421 B1 | 9/2010 | Scofield et al. |
| 7,831,582 B1 | 11/2010 | Scofield et al. |
| 7,865,528 B2 | 1/2011 | Neil |
| 7,865,720 B2 | 1/2011 | Little et al. |
| 7,890,528 B1 | 2/2011 | Khoshnevisan |
| 7,904,531 B2 | 3/2011 | Toomey |
| 7,925,782 B2 | 4/2011 | Sivasubramanian et al. |
| 7,945,637 B2 | 5/2011 | Van Vleet et al. |
| 7,966,184 B2 | 6/2011 | O'Canar et al. |
| 7,966,395 B1 | 6/2011 | Pope et al. |
| 7,975,000 B2 | 7/2011 | Dixon et al. |
| 7,991,859 B1 | 8/2011 | Miller et al. |
| 7,996,912 B2 | 8/2011 | Spalink et al. |
| 8,010,545 B2 | 8/2011 | Stefik et al. |
| 8,010,679 B2 | 8/2011 | Low et al. |
| 8,015,343 B2 | 9/2011 | Garman et al. |
| 8,015,496 B1 | 9/2011 | Rogers |
| 8,046,435 B1 | 10/2011 | Parekh et al. |
| 8,051,166 B1 | 11/2011 | Baumback et al. |
| 8,051,180 B2 | 11/2011 | Mazzaferri et al. |
| 8,060,463 B1 | 11/2011 | Spiegel |
| 8,060,616 B1 | 11/2011 | Richardson et al. |
| 8,065,417 B1 | 11/2011 | Richardson et al. |
| 8,073,850 B1 | 12/2011 | Hubbard et al. |
| 8,079,087 B1 | 12/2011 | Spies et al. |
| 8,103,742 B1 | 1/2012 | Green |
| 8,103,769 B1 | 1/2012 | Weiser et al. |
| 8,117,314 B2 | 2/2012 | Croft et al. |
| 8,122,098 B1 | 2/2012 | Richardson et al. |
| 8,171,085 B1 | 5/2012 | Tevanian, Jr. |
| 8,185,621 B2 | 5/2012 | Kasha |
| 8,195,767 B2 | 6/2012 | Albrecht et al. |
| 8,204,359 B2 | 6/2012 | Ljolje |
| 8,209,623 B2 | 6/2012 | Barletta et al. |
| 8,224,964 B1 | 7/2012 | Fredrickson et al. |
| 8,249,904 B1 | 8/2012 | DeSantis et al. |
| 8,271,887 B2 | 9/2012 | Offer et al. |
| 8,307,396 B2 | 11/2012 | Tofighbakhsh |
| 8,316,124 B1 | 11/2012 | Baumback et al. |
| 8,336,049 B2 | 12/2012 | Medovich |
| 8,359,637 B2 | 1/2013 | Yau et al. |
| 8,386,514 B2 | 2/2013 | Cheng et al. |
| 8,391,218 B1 | 3/2013 | Joshi et al. |
| 8,392,617 B1 * | 3/2013 | Weber et al. .................. 709/248 |
| 8,392,980 B1 | 3/2013 | Ahrens et al. |
| 8,448,245 B2 | 5/2013 | Banerjee et al. |
| 8,499,088 B1 | 7/2013 | Breau et al. |
| 8,510,443 B2 | 8/2013 | Kim |
| 8,566,137 B1 | 10/2013 | Cabrera et al. |
| 8,621,621 B1 | 12/2013 | Burns et al. |
| 8,660,129 B1 | 2/2014 | Brendel et al. |
| 8,671,022 B2 | 3/2014 | Sinn et al. |
| 8,683,585 B1 | 3/2014 | Chen et al. |
| 8,706,860 B2 | 4/2014 | Trahan et al. |
| 8,739,170 B1 | 5/2014 | Gupta et al. |
| 8,826,242 B2 | 9/2014 | Livshits et al. |
| 2001/0036182 A1 | 11/2001 | Addante |
| 2001/0039490 A1 | 11/2001 | Verbitsky et al. |
| 2001/0051996 A1 | 12/2001 | Cooper et al. |
| 2001/0052006 A1 | 12/2001 | Barker et al. |
| 2002/0016925 A1 | 2/2002 | Pennec et al. |
| 2002/0026511 A1 | 2/2002 | Garcia-Luna-Aceves et al. |
| 2002/0030703 A1 | 3/2002 | Robertson et al. |
| 2002/0040395 A1 | 4/2002 | Davis et al. |
| 2002/0069369 A1 | 6/2002 | Tremain |
| 2002/0073155 A1 | 6/2002 | Anupam et al. |
| 2002/0103846 A1 | 8/2002 | Zisapel et al. |
| 2002/0107985 A1 | 8/2002 | Hwang et al. |
| 2002/0129119 A1 | 9/2002 | Aoki et al. |
| 2002/0184493 A1 | 12/2002 | Rees |
| 2002/0194302 A1 | 12/2002 | Blumberg |
| 2003/0004882 A1 | 1/2003 | Holler et al. |
| 2003/0005041 A1 | 1/2003 | Ullmann et al. |
| 2003/0009742 A1 | 1/2003 | Bass et al. |
| 2003/0023712 A1 | 1/2003 | Zhao et al. |
| 2003/0033434 A1 | 2/2003 | Kavacheri et al. |
| 2003/0041106 A1 | 2/2003 | Tuli |
| 2003/0046335 A1 | 3/2003 | Doyle et al. |
| 2003/0080995 A1 | 5/2003 | Tenenbaum et al. |
| 2003/0084121 A1 | 5/2003 | De Boor et al. |
| 2003/0097592 A1 | 5/2003 | Adusumilli |
| 2003/0126433 A1 | 7/2003 | Hui |
| 2003/0137531 A1 | 7/2003 | Katinsky et al. |
| 2003/0149646 A1 | 8/2003 | Chen et al. |
| 2003/0187932 A1 | 10/2003 | Kennedy |
| 2003/0208570 A1 | 11/2003 | Lapidous |
| 2003/0229697 A1 | 12/2003 | Borella |
| 2003/0233621 A1 | 12/2003 | Paolini et al. |
| 2004/0006481 A1 | 1/2004 | Kiecza et al. |
| 2004/0010543 A1 | 1/2004 | Grobman |
| 2004/0030887 A1 | 2/2004 | Harrisville-Wolff et al. |
| 2004/0066397 A1 | 4/2004 | Walker et al. |
| 2004/0073713 A1 | 4/2004 | Pentikainen et al. |
| 2004/0083294 A1 | 4/2004 | Lewis |
| 2004/0093376 A1 | 5/2004 | De Boor et al. |
| 2004/0093493 A1 | 5/2004 | Bisbee et al. |
| 2004/0098463 A1 | 5/2004 | Shen et al. |

(56) References Cited

U.S. PATENT DOCUMENTS

| | | |
|---|---|---|
| 2004/0139208 A1 | 7/2004 | Tuli |
| 2004/0143579 A1 | 7/2004 | Nakazawa |
| 2004/0181613 A1 | 9/2004 | Hashimoto et al. |
| 2004/0205448 A1 | 10/2004 | Grefenstette et al. |
| 2004/0220905 A1 | 11/2004 | Chen et al. |
| 2004/0228335 A1 | 11/2004 | Park et al. |
| 2004/0243622 A1 | 12/2004 | Morisawa |
| 2004/0267723 A1 | 12/2004 | Bharat |
| 2005/0010863 A1 | 1/2005 | Zernik |
| 2005/0027815 A1 | 2/2005 | Christodoulou et al. |
| 2005/0033577 A1 | 2/2005 | Bradley et al. |
| 2005/0060643 A1 | 3/2005 | Glass et al. |
| 2005/0138382 A1 | 6/2005 | Hougaard et al. |
| 2005/0147044 A1 | 7/2005 | Teodosiu et al. |
| 2005/0160014 A1 | 7/2005 | Moss et al. |
| 2005/0183039 A1 | 8/2005 | Revis |
| 2005/0188361 A1 | 8/2005 | Cai et al. |
| 2005/0204276 A1 | 9/2005 | Hosea et al. |
| 2005/0246193 A1 | 11/2005 | Roever et al. |
| 2005/0255829 A1 | 11/2005 | Kirkup et al. |
| 2005/0257400 A1* | 11/2005 | Sommerer et al. ............... 36/13 |
| 2005/0273463 A1 | 12/2005 | Zohar et al. |
| 2006/0031774 A1 | 2/2006 | Gaudette |
| 2006/0085766 A1 | 4/2006 | Dominowska et al. |
| 2006/0095336 A1 | 5/2006 | Heckerman et al. |
| 2006/0112167 A1 | 5/2006 | Steele et al. |
| 2006/0122889 A1 | 6/2006 | Burdick et al. |
| 2006/0123092 A1 | 6/2006 | Madams et al. |
| 2006/0161535 A1 | 7/2006 | Holbrook |
| 2006/0168510 A1 | 7/2006 | Bryar et al. |
| 2006/0184421 A1 | 8/2006 | Lipsky et al. |
| 2006/0212509 A1 | 9/2006 | Feigenbaum et al. |
| 2006/0242192 A1 | 10/2006 | Musgrove et al. |
| 2006/0248195 A1 | 11/2006 | Toumura et al. |
| 2006/0248442 A1 | 11/2006 | Rosenstein et al. |
| 2006/0259462 A1 | 11/2006 | Timmons |
| 2006/0265472 A1 | 11/2006 | Seitz et al. |
| 2006/0277167 A1 | 12/2006 | Gross et al. |
| 2006/0280121 A1 | 12/2006 | Matoba |
| 2006/0294366 A1 | 12/2006 | Nadalin et al. |
| 2006/0294461 A1 | 12/2006 | Nadamoto et al. |
| 2007/0022072 A1 | 1/2007 | Kao et al. |
| 2007/0027672 A1 | 2/2007 | Decary et al. |
| 2007/0073704 A1 | 3/2007 | Bowden et al. |
| 2007/0094241 A1 | 4/2007 | M. Blackwell et al. |
| 2007/0118740 A1 | 5/2007 | Deishi |
| 2007/0118801 A1 | 5/2007 | Harshbarger et al. |
| 2007/0118803 A1 | 5/2007 | Walker et al. |
| 2007/0124693 A1 | 5/2007 | Dominowska et al. |
| 2007/0139430 A1 | 6/2007 | Korn et al. |
| 2007/0150727 A1 | 6/2007 | Miyazawa |
| 2007/0150737 A1 | 6/2007 | Parupudi et al. |
| 2007/0168535 A1 | 7/2007 | Ikonen et al. |
| 2007/0180503 A1 | 8/2007 | Li et al. |
| 2007/0198364 A1 | 8/2007 | Quoe et al. |
| 2007/0208687 A1 | 9/2007 | O'Canar et al. |
| 2007/0226044 A1 | 9/2007 | Hanson |
| 2007/0240160 A1 | 10/2007 | Paterson-Jones et al. |
| 2007/0245260 A1 | 10/2007 | Koppert |
| 2007/0288589 A1 | 12/2007 | Chen et al. |
| 2007/0288855 A1 | 12/2007 | Rohrbaugh et al. |
| 2008/0016040 A1 | 1/2008 | Jones et al. |
| 2008/0028334 A1 | 1/2008 | De Mes |
| 2008/0059557 A1 | 3/2008 | DeSantis et al. |
| 2008/0086264 A1 | 4/2008 | Fisher |
| 2008/0104502 A1 | 5/2008 | Olston |
| 2008/0133540 A1 | 6/2008 | Hubbard et al. |
| 2008/0134033 A1 | 6/2008 | Burns et al. |
| 2008/0134058 A1 | 6/2008 | Shen et al. |
| 2008/0148401 A1 | 6/2008 | Shen |
| 2008/0155691 A1 | 6/2008 | Fossen et al. |
| 2008/0172607 A1 | 7/2008 | Baer |
| 2008/0181580 A1 | 7/2008 | Sakai et al. |
| 2008/0183672 A1 | 7/2008 | Canon et al. |
| 2008/0183889 A1 | 7/2008 | Andreev et al. |
| 2008/0184128 A1 | 7/2008 | Swenson et al. |
| 2008/0189770 A1 | 8/2008 | Sachtjen |
| 2008/0209325 A1 | 8/2008 | Suito et al. |
| 2008/0222299 A1 | 9/2008 | Boodaei |
| 2008/0229025 A1 | 9/2008 | Plamondon |
| 2008/0232775 A1 | 9/2008 | Ljolje |
| 2008/0288486 A1 | 11/2008 | Kim et al. |
| 2008/0289047 A1 | 11/2008 | Benea et al. |
| 2008/0301225 A1 | 12/2008 | Kamura |
| 2008/0320225 A1 | 12/2008 | Panzer et al. |
| 2009/0006258 A1 | 1/2009 | Ross |
| 2009/0012969 A1 | 1/2009 | Rail et al. |
| 2009/0013034 A1 | 1/2009 | Cheng et al. |
| 2009/0049443 A1 | 2/2009 | Powers et al. |
| 2009/0063854 A1 | 3/2009 | Parkinson |
| 2009/0063983 A1 | 3/2009 | Amidon et al. |
| 2009/0100345 A1 | 4/2009 | Miller |
| 2009/0103470 A1 | 4/2009 | Candelore |
| 2009/0132640 A1 | 5/2009 | Verma et al. |
| 2009/0150343 A1 | 6/2009 | English et al. |
| 2009/0164597 A1 | 6/2009 | Shuster |
| 2009/0164924 A1 | 6/2009 | Flake et al. |
| 2009/0187819 A1 | 7/2009 | Bonefas et al. |
| 2009/0198618 A1 | 8/2009 | Chan et al. |
| 2009/0204478 A1 | 8/2009 | Kaib et al. |
| 2009/0204964 A1 | 8/2009 | Foley et al. |
| 2009/0217199 A1 | 8/2009 | Hara et al. |
| 2009/0240717 A1 | 9/2009 | Mimatsu |
| 2009/0241191 A1 | 9/2009 | Keromytis et al. |
| 2009/0248680 A1 | 10/2009 | Kalavade |
| 2009/0254867 A1 | 10/2009 | Farouki et al. |
| 2009/0276488 A1 | 11/2009 | Alstad |
| 2009/0282021 A1 | 11/2009 | Bennett |
| 2009/0287659 A1 | 11/2009 | Bennett |
| 2009/0287698 A1 | 11/2009 | Marmaros et al. |
| 2009/0327517 A1 | 12/2009 | Sivasubramanian et al. |
| 2009/0327914 A1 | 12/2009 | Adar et al. |
| 2010/0005394 A1 | 1/2010 | Dubnov |
| 2010/0017704 A1 | 1/2010 | Jaffe et al. |
| 2010/0017880 A1 | 1/2010 | Masood |
| 2010/0027552 A1 | 2/2010 | Hill |
| 2010/0031028 A1 | 2/2010 | Adams et al. |
| 2010/0036740 A1 | 2/2010 | Barashi |
| 2010/0042724 A1 | 2/2010 | Jeon et al. |
| 2010/0048296 A1 | 2/2010 | Adiraju |
| 2010/0050201 A1 | 2/2010 | Kubota et al. |
| 2010/0057639 A1 | 3/2010 | Schwarz et al. |
| 2010/0070569 A1 | 3/2010 | Turakhia |
| 2010/0070849 A1 | 3/2010 | Sadan et al. |
| 2010/0088404 A1 | 4/2010 | Mani et al. |
| 2010/0115126 A1 | 5/2010 | Kanakadandi et al. |
| 2010/0125507 A1 | 5/2010 | Tarantino, III et al. |
| 2010/0131594 A1 | 5/2010 | Kashimoto |
| 2010/0131646 A1 | 5/2010 | Drako |
| 2010/0135473 A1 | 6/2010 | Dewing et al. |
| 2010/0138293 A1 | 6/2010 | Ramer et al. |
| 2010/0138534 A1 | 6/2010 | Mutnuru et al. |
| 2010/0144314 A1 | 6/2010 | Sherkin et al. |
| 2010/0145902 A1 | 6/2010 | Boyan et al. |
| 2010/0185864 A1 | 7/2010 | Gerdes et al. |
| 2010/0191544 A1 | 7/2010 | Bosworth et al. |
| 2010/0198742 A1 | 8/2010 | Chang et al. |
| 2010/0218106 A1 | 8/2010 | Chen et al. |
| 2010/0223470 A1 | 9/2010 | Lord et al. |
| 2010/0235473 A1 | 9/2010 | Koren et al. |
| 2010/0278453 A1 | 11/2010 | King |
| 2010/0281112 A1 | 11/2010 | Plamondon |
| 2010/0293190 A1 | 11/2010 | Kaiser et al. |
| 2010/0312750 A1 | 12/2010 | Moore et al. |
| 2010/0312788 A1 | 12/2010 | Bailey |
| 2010/0313149 A1 | 12/2010 | Zhang et al. |
| 2010/0318892 A1 | 12/2010 | Teevan et al. |
| 2010/0325239 A1 | 12/2010 | Khedouri et al. |
| 2010/0325287 A1 | 12/2010 | Jagadeeswaran et al. |
| 2010/0332513 A1 | 12/2010 | Azar et al. |
| 2011/0010762 A1 | 1/2011 | Nijdam et al. |
| 2011/0022957 A1 | 1/2011 | Lee |
| 2011/0029854 A1 | 2/2011 | Nashi et al. |
| 2011/0055203 A1 | 3/2011 | Gutt et al. |

(56) References Cited

U.S. PATENT DOCUMENTS

| | | |
|---|---|---|
| 2011/0055398 A1 | 3/2011 | DeHaan et al. |
| 2011/0066982 A1 | 3/2011 | Paulsami et al. |
| 2011/0072502 A1 | 3/2011 | Song et al. |
| 2011/0078140 A1 | 3/2011 | Dube et al. |
| 2011/0078705 A1 | 3/2011 | Maclinovsky et al. |
| 2011/0119352 A1 | 5/2011 | Perov |
| 2011/0119374 A1 | 5/2011 | Ruhl et al. |
| 2011/0119661 A1 | 5/2011 | Agrawal et al. |
| 2011/0126296 A1 | 5/2011 | Moore |
| 2011/0154028 A1 | 6/2011 | Kirkup et al. |
| 2011/0161849 A1 | 6/2011 | Stallings et al. |
| 2011/0167156 A1 | 7/2011 | Mani et al. |
| 2011/0173177 A1 | 7/2011 | Junqueira et al. |
| 2011/0173637 A1 | 7/2011 | Brandwine et al. |
| 2011/0178868 A1 | 7/2011 | Garg et al. |
| 2011/0185025 A1 | 7/2011 | Cherukuri et al. |
| 2011/0191327 A1 | 8/2011 | Lee |
| 2011/0197121 A1 | 8/2011 | Kletter |
| 2011/0202848 A1 | 8/2011 | Ismalon |
| 2011/0208822 A1 | 8/2011 | Rathod |
| 2011/0208840 A1 | 8/2011 | Blackman |
| 2011/0212717 A1 | 9/2011 | Rhoads et al. |
| 2011/0213966 A1 | 9/2011 | Fu et al. |
| 2011/0214082 A1 | 9/2011 | Osterhout et al. |
| 2011/0219448 A1 | 9/2011 | Sreedharan et al. |
| 2011/0231555 A1 | 9/2011 | Ebrahimi et al. |
| 2011/0246873 A1 | 10/2011 | Tolle et al. |
| 2011/0249074 A1 | 10/2011 | Cranfill et al. |
| 2011/0256889 A1 | 10/2011 | Polis et al. |
| 2011/0261828 A1 | 10/2011 | Smith |
| 2011/0264649 A1 | 10/2011 | Hsiao et al. |
| 2011/0282997 A1 | 11/2011 | Prince et al. |
| 2011/0289074 A1 | 11/2011 | Leban |
| 2011/0289157 A1* | 11/2011 | Pirnazar .................. 709/206 |
| 2011/0296341 A1 | 12/2011 | Koppert |
| 2011/0296503 A1 | 12/2011 | Shull et al. |
| 2011/0302510 A1 | 12/2011 | Harrison et al. |
| 2011/0314154 A1 | 12/2011 | Resch et al. |
| 2011/0320598 A1 | 12/2011 | Solin |
| 2011/0321100 A1 | 12/2011 | Tofighbakhsh |
| 2011/0321139 A1 | 12/2011 | Jayaraman et al. |
| 2012/0005258 A1 | 1/2012 | Cok et al. |
| 2012/0005276 A1 | 1/2012 | Guo et al. |
| 2012/0005600 A1 | 1/2012 | Ito |
| 2012/0022942 A1 | 1/2012 | Holloway et al. |
| 2012/0023487 A1 | 1/2012 | Letca et al. |
| 2012/0030460 A1 | 2/2012 | Chang |
| 2012/0047234 A1* | 2/2012 | Terayoko .................. 709/219 |
| 2012/0047449 A1 | 2/2012 | Buckart et al. |
| 2012/0054316 A1 | 3/2012 | Piazza et al. |
| 2012/0054869 A1 | 3/2012 | Yen et al. |
| 2012/0066502 A1 | 3/2012 | Borneman et al. |
| 2012/0066586 A1 | 3/2012 | Shemesh |
| 2012/0072821 A1 | 3/2012 | Bowling |
| 2012/0084433 A1 | 4/2012 | Bar-Caspi et al. |
| 2012/0084644 A1 | 4/2012 | Robert et al. |
| 2012/0096269 A1 | 4/2012 | McAlister |
| 2012/0096365 A1 | 4/2012 | Wilkinson et al. |
| 2012/0110017 A1 | 5/2012 | Gu et al. |
| 2012/0117565 A1 | 5/2012 | Staelin et al. |
| 2012/0117649 A1 | 5/2012 | Holloway et al. |
| 2012/0137201 A1 | 5/2012 | White et al. |
| 2012/0143944 A1 | 6/2012 | Reeves et al. |
| 2012/0144288 A1 | 6/2012 | Caruso et al. |
| 2012/0150844 A1 | 6/2012 | Lindahl et al. |
| 2012/0158694 A1 | 6/2012 | Skrenta et al. |
| 2012/0166526 A1 | 6/2012 | Ambardekar |
| 2012/0166922 A1 | 6/2012 | Rolles |
| 2012/0192220 A1 | 7/2012 | Wyatt et al. |
| 2012/0198020 A1 | 8/2012 | Parker et al. |
| 2012/0198516 A1 | 8/2012 | Lim |
| 2012/0203904 A1 | 8/2012 | Niemela et al. |
| 2012/0206317 A1 | 8/2012 | Wong et al. |
| 2012/0210233 A1 | 8/2012 | Davis et al. |
| 2012/0215833 A1* | 8/2012 | Chen et al. .................. 709/203 |
| 2012/0215834 A1* | 8/2012 | Chen et al. .................. 709/203 |
| 2012/0215919 A1 | 8/2012 | Labat et al. |
| 2012/0216035 A1 | 8/2012 | Leggette et al. |
| 2012/0254402 A1 | 10/2012 | Panidepu et al. |
| 2012/0284629 A1 | 11/2012 | Peters et al. |
| 2012/0290348 A1 | 11/2012 | Hackett et al. |
| 2012/0297341 A1 | 11/2012 | Glazer et al. |
| 2012/0317295 A1 | 12/2012 | Baird et al. |
| 2012/0324043 A1 | 12/2012 | Burkard et al. |
| 2012/0331406 A1 | 12/2012 | Baird et al. |
| 2013/0007101 A1 | 1/2013 | Trahan et al. |
| 2013/0007102 A1 | 1/2013 | Trahan et al. |
| 2013/0031461 A1 | 1/2013 | Hou et al. |
| 2013/0046878 A1 | 2/2013 | Fryc et al. |
| 2013/0051686 A1 | 2/2013 | Bennett |
| 2013/0073388 A1 | 3/2013 | Heath |
| 2013/0080611 A1 | 3/2013 | Li et al. |
| 2013/0097380 A1* | 4/2013 | Colgrove et al. .............. 711/118 |
| 2013/0097494 A1 | 4/2013 | St. Jacques et al. |
| 2013/0103785 A1 | 4/2013 | Lyon |
| 2013/0111579 A1 | 5/2013 | Newman et al. |
| 2013/0165238 A1 | 6/2013 | Batista Jerez |
| 2013/0185715 A1 | 7/2013 | Dunning et al. |
| 2013/0198641 A1 | 8/2013 | Brownlow et al. |
| 2013/0198823 A1 | 8/2013 | Hitchcock et al. |
| 2013/0202150 A1 | 8/2013 | Sinha et al. |
| 2013/0318354 A1 | 11/2013 | Entschew et al. |
| 2014/0006129 A1 | 1/2014 | Heath |

OTHER PUBLICATIONS

Brinkmann, M., "Record and Share your browser history with Hooeey," ghacks.net, Feb. 26, 2008, 6 pages, printed on Jan. 25, 2013.

Considine, A., "The Footprints of Web Feet," The New York Times, Mar. 4, 2011, 3 pages, printed on Jan. 25, 2013.

EyeBrowse: Record, Visualize and Share your Browser History, Information Aesthetics, Sep. 18, 2009, 2 pages, printed on Jan. 25, 2013.

Feuerstein, Adam, "Flyswat Takes Aim," San Francisco Business Times, printed from http://www.bizjournals.com/sanfrancisco/stories/1999/10/25/story2.html?t=printable, Oct. 22, 1999, 2 pages.

Gabber, et al., "How to Make Personalized Web Browsing Simple, Secure, and Anonymous," Financial Cryptography, 16 pages (1997).

Gingerich, Jason, "Keycorp Making Site Into Portal," KRTBN Knight-Ridder Tribune Business News (South Bend Tribune, Indiana), Oct. 25, 1999, 2 pages.

Hopper, D. Ian, "Desktops Now Have Power to Comparison-Shop," Oct. 18, 1999, printed from http://www.cnn.com/TECH/computing/9910/18/r.u.sure/index.html, 3 pages.

Van Kleek, M., Introducing "Eyebrowse"—Track and share your web browsing in real time, Haystack Blog, Aug. 28, 2009, 3 pages, printed on Jan. 25, 2013.

Web page titled "RSS Ticker: Add-ons for Firefox," https://addons.mozilla.org/en-US/firefox/addon/rss-ticker/, 3 printed pages, printed on Feb. 7, 2013.

Web page titled "What Internet Users Do on a Typical Day, Trend Data (Adults), Pew Internet & American Life Project," printed from http://pewinternet.org/Static-Pages/Trend-Data-(Adults)/Online-Activities-Daily.aspx on Nov. 29, 2012, 4 pages.

Chen, H., et al., "Bringing Order to the Web: Automatically Categorizing Search Results," Proceedings of the SIGCHI Conference on Human Factors in Computing Systems, Apr. 1-6, 2000, pp. 145-152.

Close 'n' Forget Firefox add on, Evilfantasy's blog, http://evilfantasy.wordpress.com/2009/03/24/close-%E2%80%98n%E2%80%99-forget-firefox-add-on/, retrieved Mar. 24, 2009, 1 page.

Rao, H.C.-H., et al., "A Proxy-Based Personal Web Archiving Service," Operating Systems Review, 35(1):61-72, 2001.

Teevan, J., et al., "Changing How People View Changes on the Web," 2009, Proceedings of the 22$^{nd}$ Annual ACM Symposium on User Interface Software and Technology, New York, 2009, pp. 237-246.

Baumann, A., et al., Enhancing STEM Classes Using Weave: A Collaborative Web-Based Visualization Environment, Integrated Stem Education Conference, Apr. 2, 2011, Ewing, New Jersey, pp. 2A-1-2A-4.

(56) References Cited

OTHER PUBLICATIONS

De Carvalho, L.G., et al., Synchronizing Web Browsing Data With Browserver, Proceedings of the IEEE Symposium on Computers and Communications, Jun. 22-25, 2010, Riccione, Italy, pp. 738-743.

Acharya, et al., Balancing Push and Pull for Data Broadcast, Proceedings of ACM SIGMOD Conference, May 1997, pp. 1-12, Tucson, AZ.

Acharya, et al., Prefetching from a Broadcast Disk, Proceedings of the International Conference on Data Engineering, Feb. 1996, New Orleans, LA.

Amazon Gives Virtual Private Clouds Internet Access, available at http://web2.sys-con.com/node/1759023/, Mar. 2011.

Bestavros, et al., Server-initiated Document Dissemination for the WWW, IEEE Data Engineering Bulletin, Sep. 1996, vol. 19, Issue 3, pp. 3-11, Boston, MA.

Brooks, et al., Application-Specific Proxy Servers as HTTP Stream Transducers, Dec. 1995, pp. 1-7.

Chinen, et al., An Interactive Prefetching Proxy Server for Improvement of WWW Latency, Jun. 1997, pp. 1-10.

Curewitz, et al., Practical Prefetching via Data Compression, SIGMOD Conference, 1993, pp. 10, San Diego, CA.

Dias, et al., A Smart Internet Caching System, 1996, pp. 1-12, Moratuwa, Sri Lanka.

Franklin, et al., Dissemination-Based Information Systems, IEEE Data Engineering Bulletin, Sep. 1996, vol. 19, Issue 3, pp. 1-9.

Gingerich, Jason, Keycorp Making Site Into Portal: Keycorp, South Bend Tribune, Ind., Apr. 9, 2009, 2 pages.

Gulbrandsen, et al., "A DNS RR for specifying the location of services (DNS SRV)", RFC 2782, 12 pages, Feb. 2000.

Inoue, et al., An Adaptive WWW Cache Mechanism in the AI3 Network, 1997, pp. 1-9.

Kumar, V., et al, "Metadata Visualization for Digital Libraries: Interactive Timeline Editing and Review," Proceedings of the Third ACM Conference on Digital Libraries, ACM, 1998, pp. 126-133.

Lubonski, et al., An Adaptation Architecture to Improve User-Perceived QoS of Multimedia Services for Enterprise Remote Desktop Protocols. NG12005, pp. 149-156.

Malik, et al., "Virtual Cloud: Rent Out the Rented Resources", 6th International Conference on Internet Technology and Secured Transactions, Dec. 2011.

Mockapetris, "Domain Names—Implementation and Specification", RFC 1035, 55 pages, Nov. 1987.

Monroy, Carlos, et al, "Interactive Timeline Viewer (ItLv): A Tool to Visualize Variants Among Documents," Visual Interfaces to Digital Libraries, Springer Berlin Heidelberg, 2002, pp. 1-11.

Opera Mini, http://en.wikipedia.org/wiki/Opera_mini, last modified on Mar. 7, 2013 at 10:31.

Padmanabhan, et al., Using Predictive Prefetching to Improve World Wide Web Latency, Computer Communication Review, 1996, vol. 26, pp. 22-36.

Shrikumar, et al., Thinternet: Life at the End of a Tether, 1994, vol. 222-09.

Sullivan, D., "Google Search History Expands, Becomes Web History", http://searchengineland.com/google-search-history-expands-becomes-web-history-11016, Apr. 19, 2007, 12 pages.

Wang, et al., Prefetching in World Wide Web, Department of Computer Science, University College London, Nov. 18-22, 1996, London, UK.

* cited by examiner

SHARED BROWSING SESSIONS

BACKGROUND

Generally described, computing devices and communication networks can be utilized to exchange information. In a common application, a computing device can request content from another computing device via the communication network. For example, a user at a computing device, such as a personal computing device, can utilize a software browser application, typically referred to as a "browser," to request a Web page from a server computing device via the Internet. In such embodiments, the requesting computing device can be referred to as a client computing device and the server computing device can be referred to as a content provider.

With reference to an illustrative example, a requested Web page, or original content, may be associated with a number of additional resources, such as images or videos, that are to be displayed with the Web page. In one specific embodiment, the additional resources of the Web page are identified by a number of embedded resource identifiers, such as uniform resource locators ("URLs"). In turn, software on the client computing devices, such as a browser, typically processes embedded resource identifiers to generate requests for the content. Accordingly, in order to satisfy a content request, one or more content providers will generally provide client computing devices data associated with the Web page as well as the data associated with the embedded resources.

Once the client computing device obtains the Web page and associated additional resources, the content may be processed in a number of stages by the software browser application or other client computing device interface. For example, and with reference to the above illustration, the software browser application may parse the Web page to process various HTML layout information and references to associated resources, may identify and process Cascading Style Sheets ("CSS") information, may process and instantiate various Javascript code associated with the Web page, may construct a native object model to represent one or more components of the Web page, and may calculate various layout and display properties of the processed content for presentation to a user.

In some scenarios, computing device users can share accessed individual network resources (e.g., Web sites) with other users by transmitting one or more network identifiers, such as URLs, corresponding to the access network resources. More specifically, users wishing to share more than one accessed network resources are limited to transmitting a set of network identifiers. However, a recipient of a set of network resources that have to be accessed separately cannot directly recreate a browsing session.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
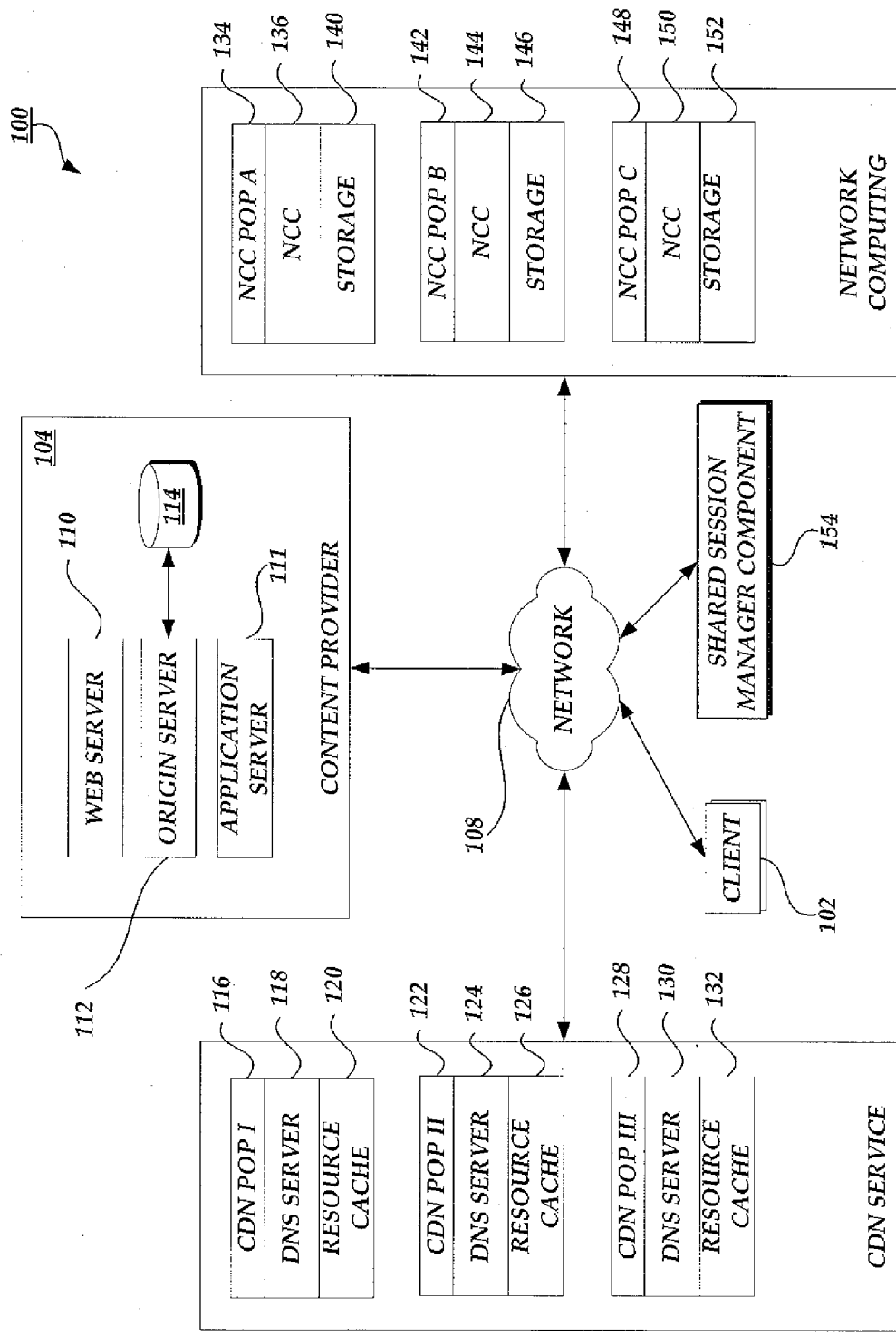
FIG. 1 is a block diagram illustrative of a content delivery environment including a number of client computing devices, content provider, a content delivery network service provider, and a network computing provider.

Generally described, the present disclosure is directed to the generation and management of a remote application session and browse session content between client computing devices and content providers in conjunction with a network computing provider. Specifically, aspects of the disclosure will be described with regard to the generation and management of shared session information between the client computing device and the network computing provider. Illustratively, the shared session information corresponds to a specification of a set of network resources accessed by the client computing device and the preservation of browse session information associated with the previous access of the set of network resources.

In one aspect, a session may be defined on a time basis such that all network resources access by a browser application over a defined time period may be considered to be part of the same session. In another aspect, a session may be defined in terms of activities, such as the opening or closing of a browser software application, such that all network resources accessed between a starting activity and ending activity may be considered to be part of the same session. In still a further aspect, a session may be defined in terms of user selectable criteria, such as the manual selection of a collection of accessed network resources to form a session. Additionally, one skilled in the relevant art will appreciate that additional or alternative definitions of a session may also be incorporated and that two or more definitions of a session may be incorporated. Illustratively, the shared session information is utilized by one or more client computing devices to access and recreate a browse session corresponding to the set of network resources.

Other aspects of the present disclosure will be described with regard to the generation and management of shared session information between client computing devices and a shared session manager component. In this embodiment, multiple client computing devices can publish or subscribe to the shared session manager component for purposes of access shared session information. For example, one or more individuals/organizations may publish shared session information for purposes of allowing one or more client computing devices to access the shared session information.

Although aspects of the embodiments described in the disclosure will focus, for the purpose of illustration, on the management of shared session information between a client computing device and either a network computing component or a shared session manager component, one skilled in the art will appreciate that the techniques disclosed herein may be applied to any number of software processes or applications, and may be applied to preserving content of any number of different document and data types. Further, although various aspects of the disclosure will be described with regard to illustrative examples and embodiments, one skilled in the art will appreciate that the disclosed embodiments and examples should not be construed as limiting.

With reference to an illustrative example, a user may cause a client computing device to load a software browser application (henceforth referred to as a "browser") for accessing content provided by one or more content providers. In one embodiment, the browser may have a content display area or pane for displaying the accessed network content in addition to one or more local interface components, such as toolbars, menus, buttons, or other user interface controls. Local interface components may be managed and controlled by the software browser application or any other process executing or implemented locally at the client computing device. Illustratively, managing user interface controls locally may allow for a responsive user interface, as interactions by the user are processed locally on the client computing device.

Subsequent to the browser being loaded, a user or automated browser process may cause the client computing device to transmit a request to access content from a content provider by establishing a browse session with a network computing provider across a private or public network. The browse session request may include information identifying one or more sources for the requested content. For example, the user may select or enter a URL, (e.g., http://www.example.com) into a browser window, causing the client computing device to transmit a request for a new browse session to the network computing provider, including the selected URL. The browse session request may further include identification information, such as information identifying the user, browser, or client computing device.

Responsive to the browse session request received from the client computing device, the network computing provider may instantiate or cause to have instantiated one or more computing components associated with the network computing provider that will host a browser software application. For example, the network computing provider can instantiate, or cause to have instantiated, an instance of a virtual machine that includes a software browser application capable of requesting resources from a communication network. Using the instantiated network computing components, the network computing provider may request the identified network resource(s) from one or more content providers, a content delivery network, or a local or associated storage component or data store. For example, the browser software application on the instantiated network computing component can process a primary network resource and then generate additional content requests for content identified in one or more embedded resource identifiers (e.g. pictures, video files, etc.). Illustratively, in the case of other non-browser applications, network resources, or content, may include any file type or format known in the art and supported by the specific software application. The "requested content" corresponds to content that will be provided to the client computing device as responsive to the current browse session request.

In an illustrative embodiment, the network computing provider or client computing device may process the identification information included in the browse session request to initialize shared session information that will capture and maintain information related to a browse session related to the access of a set of network resources. Illustratively, the shared session information may be maintained by a network computing provider hosting the one or more computing components, a shared session manager component that functions as a service provider or a combination thereof.

Having obtained the requested content (e.g., the requested network resource and embedded resources), the network computing provider may identify a client remote session browse configuration specifying a remote session communication protocol for use in transmitting the requested content, user interaction data, intermediate processing results, and other information between the browser being executed on the client computing device and the browser being executed at the instantiated network computing component on the computing and storage provider. Additionally, the information exchanged between the browser on the instantiated network computing component and the browser on the client computing device can be generally referred to as "browser session information." The shared session information is updated with each network resource accessed by the client computing device and the browser session information associated with such access.

In addition to specifying a remote session communication protocol for transmitting information between the client computing device and the instantiated network computing component, in one embodiment, the identified client remote session browse configuration may specify that one or more processing actions to be performed on the requested content are to be performed at the network computing provider rather than, or in addition to, at the client computing device. A Web page, for example, may be parsed and processed to process various HTML layout information and references to associated resources or embedded content, such as CSS style sheets and Javascript, as well as embedded content objects such as images, video, audio, etc. Each object or piece of code may be parsed and processed before a representative object model corresponding to the web page may be constructed and processed further for layout and display. The client remote session browse configuration may identify which of these actions are to be performed at a network computing component and which are to be performed at the client computing device.

At a subsequent point in time, one or more client computing devices may access the shared session information. For example, a user may publish shared session information corresponding to a celebrity browser session. In another example, a user may be forwarded a shared session identifier that provides access to shared session information or may utilize shared session information as an archive of a previous browser session. Illustratively, accessing the shared session information can result in a client computing device accessing a currently established browser session being hosted on a network computing provider, creating new browsing sessions on a network computing provider or individually accessing the network resources directly from the content provider or accessing an archival copy of the network resources as they were accessed a specified time (such as when the shared session information was created, modified or updated).

FIG. 1 is a block diagram illustrative of a networked computing environment 100 for the management and processing of content requests. As illustrated in FIG. 1, the networked computing environment 100 includes a number of client computing devices 102 (generally referred to as clients) for requesting content and content processing from a content provider 104, CDN service provider 106, or network computing provider 107. In an illustrative embodiment, the client computing devices 102 can correspond to a wide variety of computing devices, including personal computing devices, laptop computing devices, hand-held computing devices, terminal computing devices, mobile devices (e.g., mobile phones, tablet computing devices, etc.), wireless devices, various electronic devices and appliances and the like. In an illustrative embodiment, the client computing devices 102 include necessary hardware and software components for establishing communications over a communication network 108, such as a wide area network or local area network. For example, the client computing devices 102 may be equipped with networking equipment and browser software applications that facilitate communications via the Internet or an intranet. The client computing devices 102 may have varied local computing resources, such as central processing units and architectures, memory, mass storage, graphics processing units, communication network availability and bandwidth, etc.

The networked computing environment 100 can also include a content provider 104 in communication with the one or more client computing devices 102 or other service providers (e.g., CDN service provider 106, network computing provider 107, etc.) via the communication network 108. The content provider 104 illustrated in FIG. 1 corresponds to a logical association of one or more computing devices associated with a content provider. Specifically, the content provider 104 can include a web server component 110 corresponding to one or more server computing devices for obtaining and processing requests for content (such as Web pages) from the client computing devices 102 or other service providers. The content provider 104 can further include an origin server component 112 and associated storage component 114 corresponding to one or more computing devices for obtaining and processing requests for network resources from the CDN service provider. The content provider 104 can still further include an application server computing device 111, such as a data streaming server, for processing streaming content requests. One skilled in the relevant art will appreciate that the content provider 104 can be associated with various additional computing resources, such as additional computing devices for administration of content and resources, DNS name servers, and the like. For example, although not illustrated in FIG. 1, the content provider 104 can be associated with one or more DNS name server components that would be authoritative to resolve client computing device DNS queries corresponding to a domain of the content provider.

With continued reference to FIG. 1, the networked computing environment 100 can further include a CDN service provider 106 in communication with the one or more client computing devices 102 and other service providers via the communication network 108. The CDN service provider 106 illustrated in FIG. 1 corresponds to a logical association of one or more computing devices associated with a CDN service provider. Specifically, the CDN service provider 106 can include a number of Point of Presence ("POP") locations 116, 122, 128 that correspond to nodes on the communication network 108. Each CDN POP 116, 122, 128 includes a DNS component 118, 124, 130 made up of a number of DNS server computing devices for resolving DNS queries from the client computers 102. Each CDN POP 116, 122, 128 also includes a resource cache component 120, 126, 132 made up of a number of cache server computing devices for storing resources from content providers and transmitting various requested resources to various client computers. The DNS components 118, 124, and 130 and the resource cache components 120, 126, 132 may further include additional software or hardware components that facilitate communications including, but not limited to, load balancing or load sharing software/hardware components.

In an illustrative embodiment, the DNS component 118, 124, 130 and resource cache component 120, 126, 132 are considered to be logically grouped, regardless of whether the components, or portions of the components, are physically separate. Additionally, although the CDN POPs 116, 122, 128 are illustrated in FIG. 1 as logically associated with the CDN service provider 106, the CDN POPs will be geographically distributed throughout the communication network 108 in a manner to best serve various demographics of client computing devices 102. Additionally, one skilled in the relevant art will appreciate that the CDN service provider 106 can be associated with various additional computing resources, such as additional computing devices for administration of content and resources, and the like.

With further continued reference to FIG. 1, the networked computing environment 100 can also include a network computing provider 107 in communication with the one or more client computing devices 102, the CDN service provider 106, and the content provider 104 via the communication network 108. The network computing provider 107 illustrated in FIG. 1 also corresponds to a logical association of one or more computing devices associated with a network computing provider. Specifically, the network computing provider 107 can include a number of Point of Presence ("POP") locations 134, 142, 148 that correspond to nodes on the communication network 108. Each POP 134, 142, 148 includes a network computing component (NCC) 136, 144, 150 for hosting applications, such as data streaming applications, via a number of instances of a virtual machine, generally referred to as an instance of an NCC. One skilled in the relevant art will appreciate that NCC 136, 144, 150 would include physical computing device resources and software to provide the multiple instances of a virtual machine or to dynamically cause the creation of instances of a virtual machine. Such creation can be based on a specific request, such as from a client computing device, or the NCC can initiate dynamic creation of an instance of a virtual machine on its own. Each NCC POP 134, 142, 148 also includes a storage component 140, 146, 152 made up of a number of storage devices for storing any type of data used in the delivery and processing of network or computing resources, including, but not limited to, user data, state information, processing requirements, historical usage data, and resources from content providers that will be processed by an instance of an NCC 136, 144, 150 and transmitted to various client computers, etc. The NCCs 136, 144, 150 and the storage components 140, 146, 152 may further include additional software or hardware components that facilitate communications, including, but not limited to, load balancing or load sharing software/hardware components for selecting instances of a virtual machine supporting a requested application or providing information to a DNS nameserver to facilitate request routing.

In an illustrative embodiment, NCCs 136, 144, 150 and the storage components 140, 146, 152 are considered to be logically grouped, regardless of whether the components, or portions of the components, are physically separate. For example, a network computing provider 107 may maintain separate POPs for providing the NCC and the storage components. Additionally, although the NCC POPs 134, 142, 148 are illustrated in FIG. 1 as logically associated with a network computing provider 107, the NCC POPs will be geographically distributed throughout the communication network 108 in a manner to best serve various demographics of client computing devices 102. Additionally, one skilled in the relevant art will appreciate that the network computing provider 107 can be associated with various additional computing resources, such additional computing devices for administration of content and resources, and the like. Even further, one skilled in the relevant art will appreciate that the components of the network computing provider 107 and components of the CDN service provider 106 can be managed by the same or different entities.

In some embodiments, the networked computing environment 100 can also include one or more shared session manager components 154 for creating and managing shared session information. Illustratively, the shared session manager component 154 can function as a network-based service communicating with client computing devices 102 or network computing providers 107 via application program interfaces ("APIs"). The shared session manager component 154 can be associated with one or more data stores for maintain shared session information. In one embodiment, the shared session manager component can correspond to a stand-alone service for processing browser session information from client computing devices 102. Although only a single shared session manager component 154 has been illustrated in FIG. 1, the networked computing environment 100 can include any number of shared session manager components. In other embodiments, the functionality associated with the shared session manager component 154 can be incorporated in the functionality provided by a service provider, such as the network computing provider 107. In a further embodiment, the client computing device 102 may also provide the functionality of the shared session manager component 154.

Figure 5:
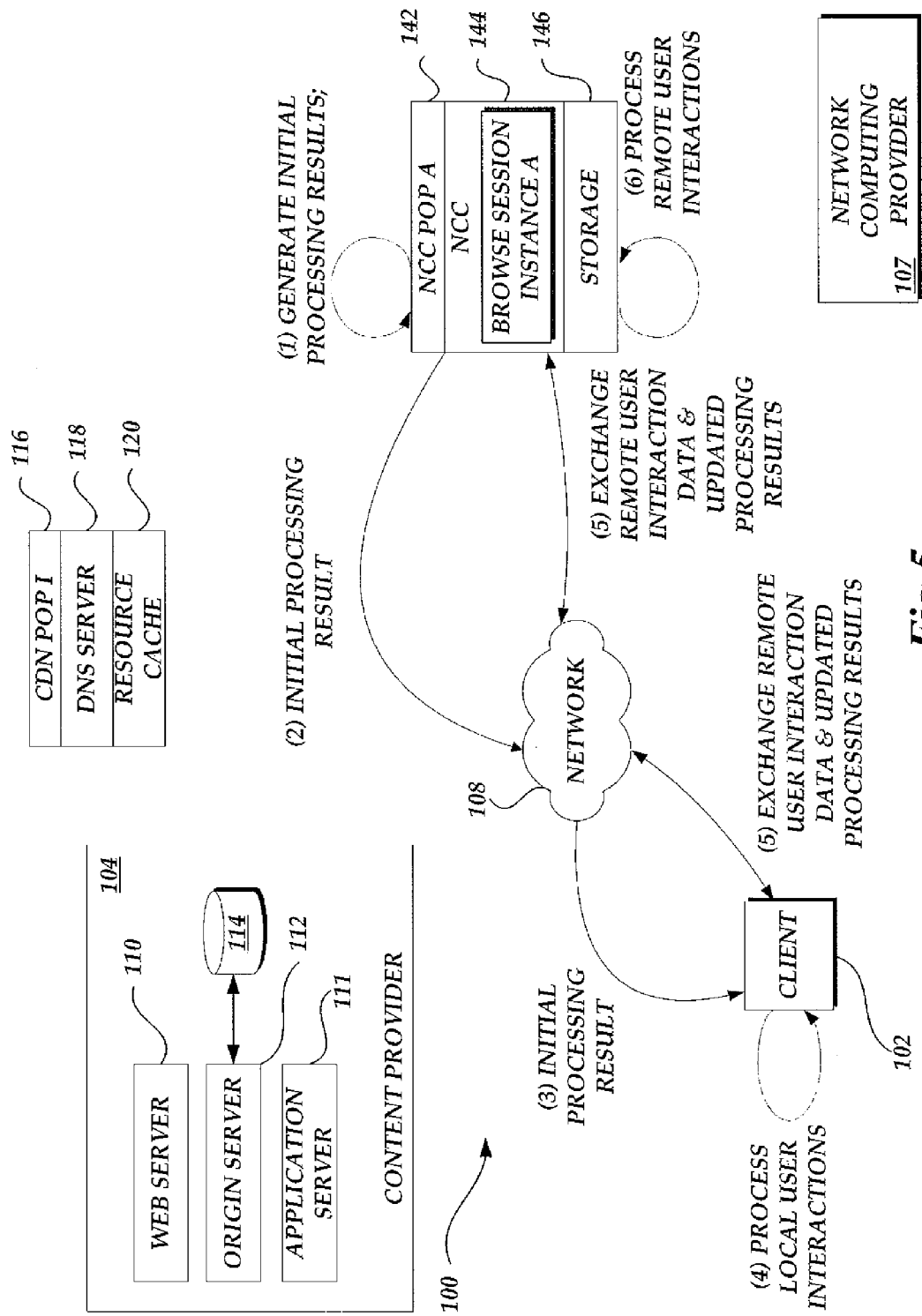
FIG. 5 is a block diagram of the content delivery environment of FIG. 1 illustrating the generation and processing of browse session data, and user interaction data between a network computing provider and client computing device.
Figure 6:
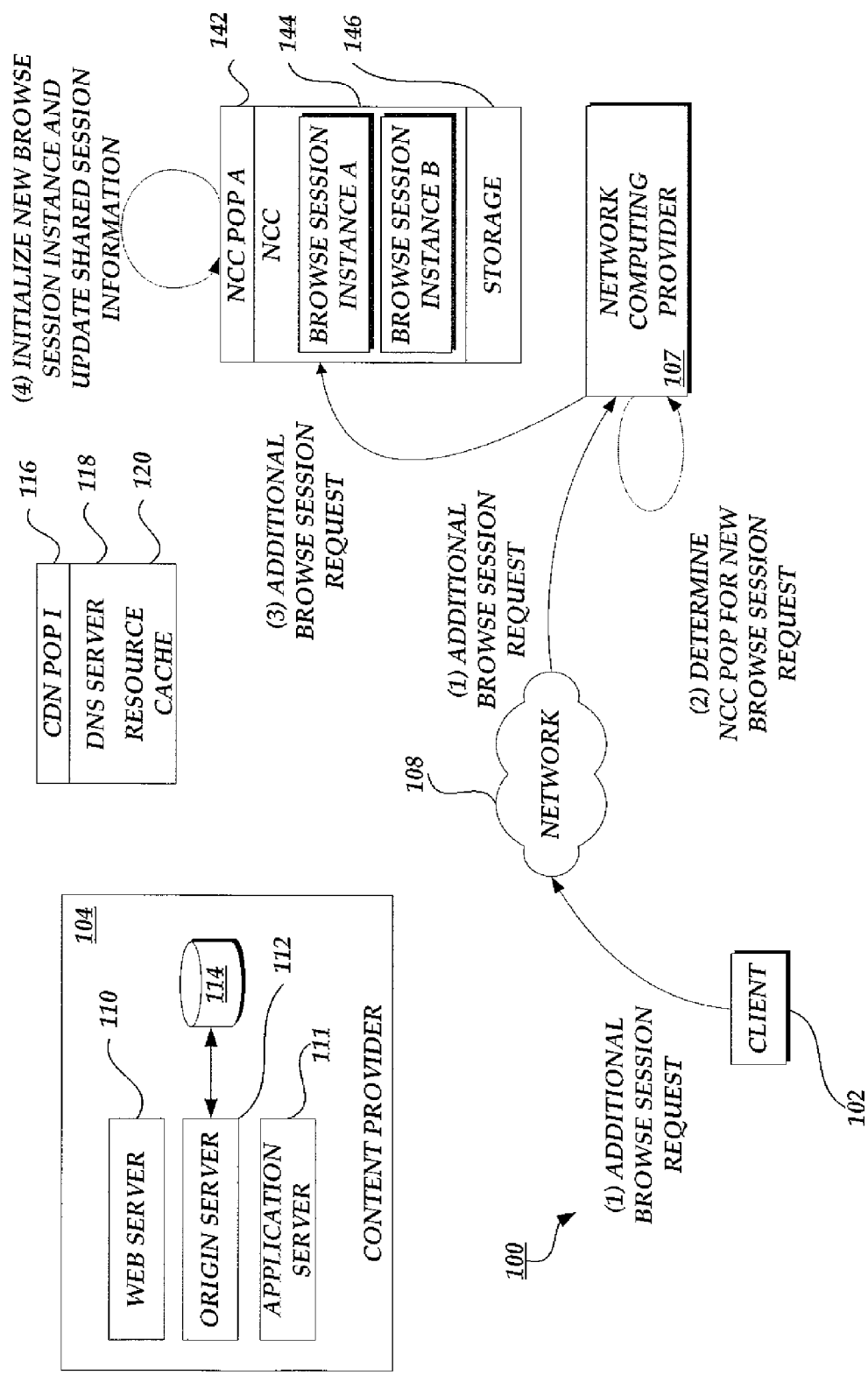
FIG. 6 is a block diagram of the content delivery environment of FIG. 1 illustrating the generation and processing of additional browse session data, and user interaction data between a network computing provider and client computing device.
Figure 7:
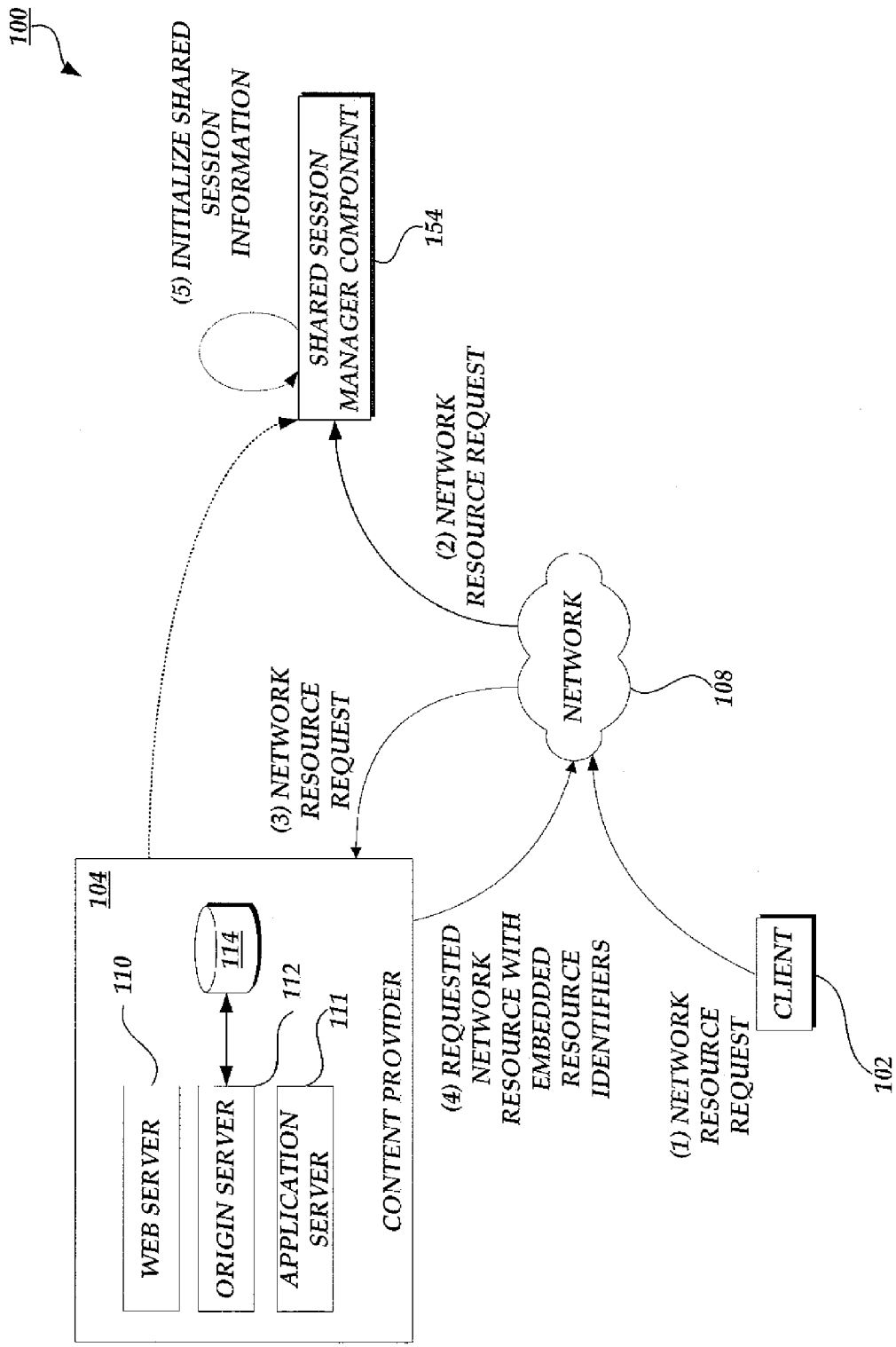
FIG. 7 is a block diagram of the content delivery environment of FIG. 1 illustrating the generation and processing of a new browse session request from a client computing device to a content provider and a shared session manager component.
Figure 8:
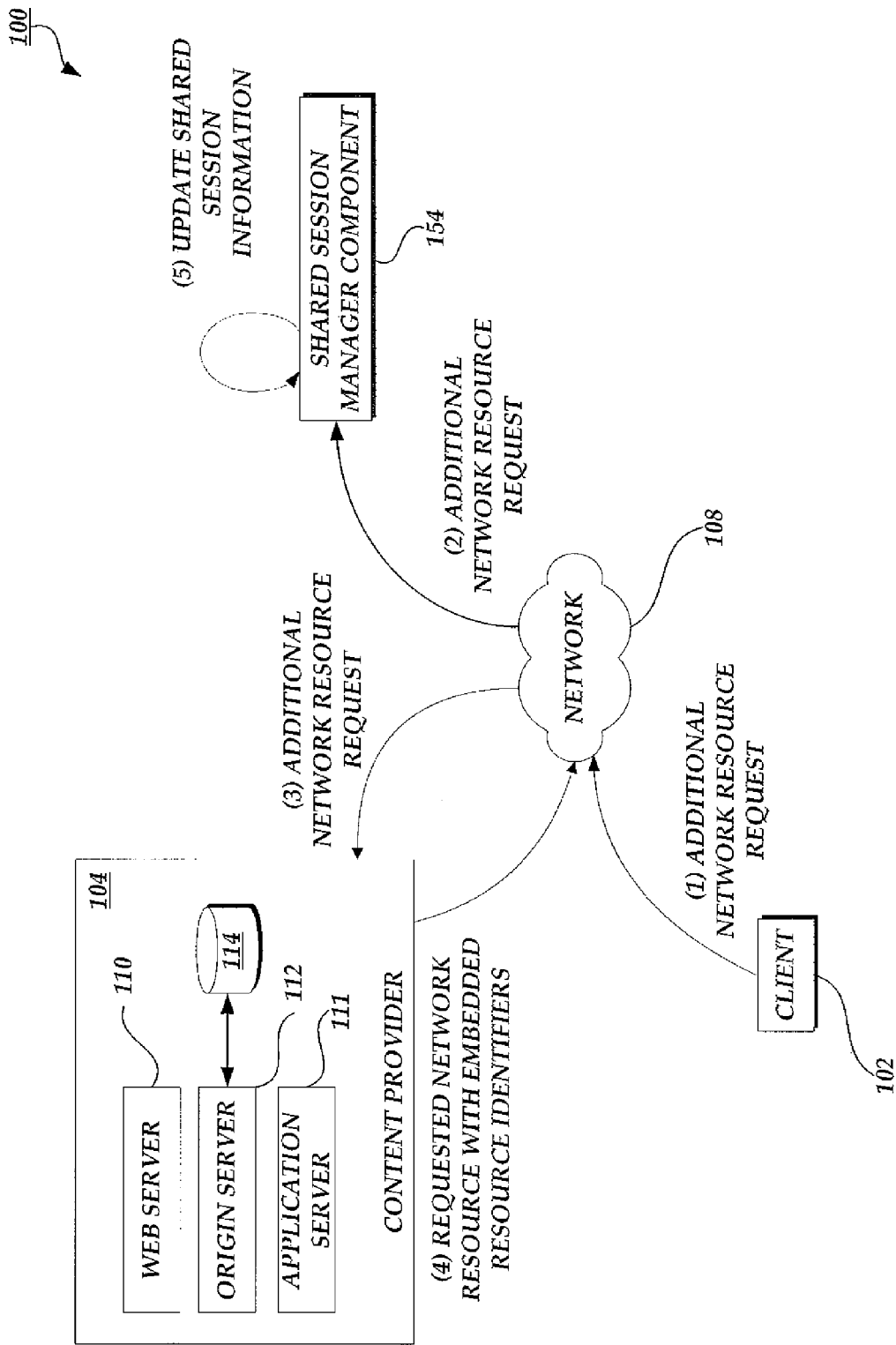
FIG. 8 is a block diagram of the content delivery environment of FIG. 1 illustrating the generation and processing of an additional browse session request from a client computing device to a content provider and a shared session manager component.

With reference now to FIGS. 2-8, the interaction between various components of the networked computing environment 100 of FIG. 1 will be illustrated. Specifically, FIGS. 2-6 illustrate the interaction between various components of the networked computing environment 100 for the exchange of content between a client computing device 102 and a content provider 104 via the network computing provider 107. FIGS. 7-8 illustrate the interaction between various components of the networked computing environment 100 for the exchange of content between a client computing device 102, a content provider 104 and a shared session manager component 154. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

Figure 2:
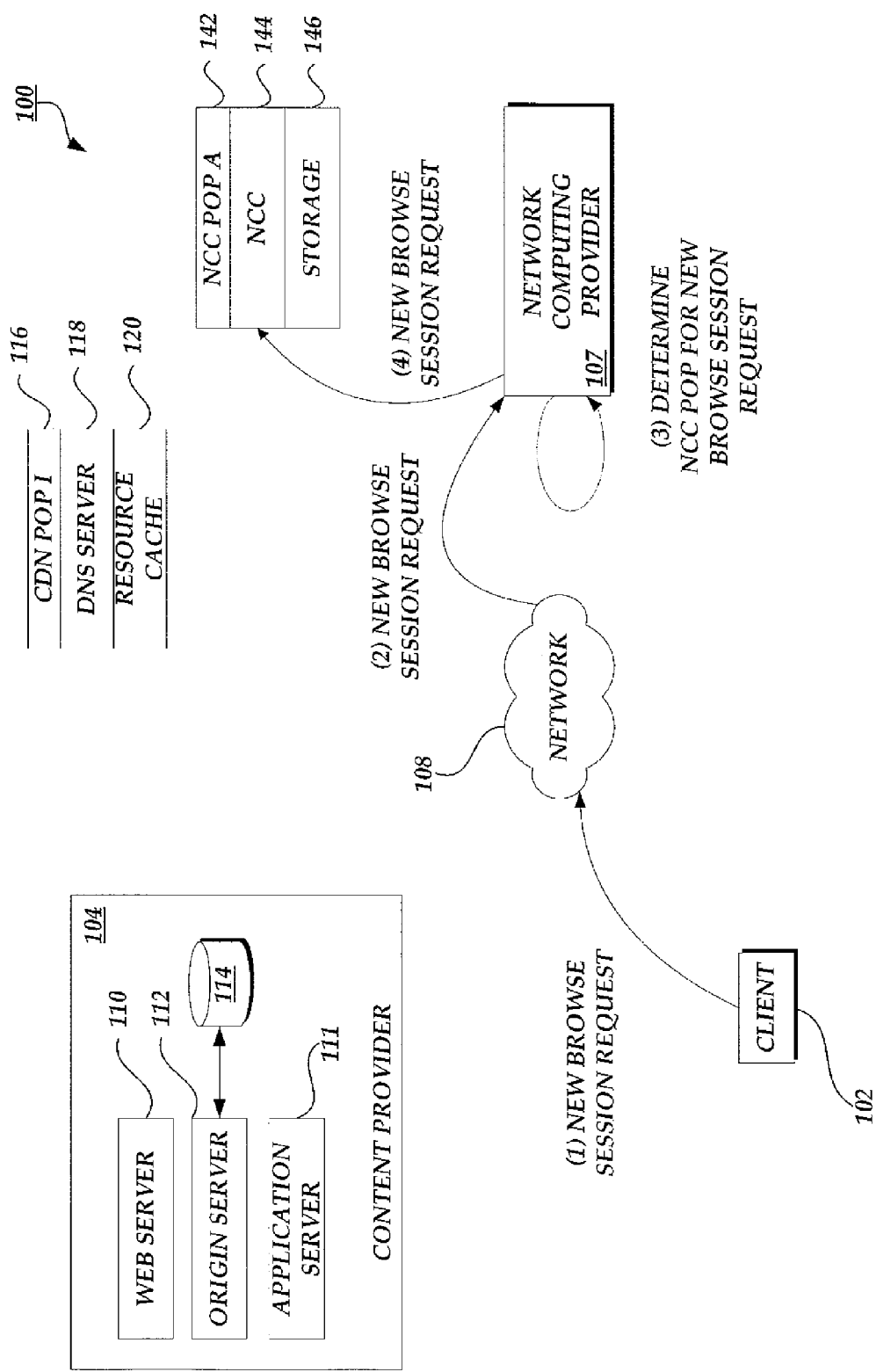
FIG. 2 is a block diagram of the content delivery environment of FIG. 1 illustrating the generation and processing of a new browse session request from a client computing device to a network computing provider.

With reference to FIG. 2, the process can begin with the generation and processing of a browse session request from a client computing device 102 to a network computing provider 107. Illustratively, the client computing device 102 may load a browser for viewing network content in response to an event or user request. Subsequent to the browser being loaded, the browser may be implemented to request a new browse session. From the perspective of the user of the client computing device 102, the request for the new browse session corresponds to the intended request to transmit the request to one or more corresponding content providers 104. Illustratively, this request may be generated automatically as a result of the browser loading (e.g., a request for a default or "home" page), or may be generated as a result of a user following a link or entering a network address into an address bar. As illustrated in FIG. 2, the browse session request may be transmitted first to a network computing provider 107. In an illustrative embodiment, the network computing provider 107 utilizes a registration API to accept browse session requests from the client computing device 102. The browse session request can include network address information corresponding to a requested network resource, which may be in any form, including, but not limited to, an Internet Protocol ("IP") address, a URL, a Media Access Control ("MAC") address, etc. The browse session request may further include information identifying a user, browser, client computing device 102, or any other browsing entity.

Subsequent to the receipt of the browse session request, the network computing provider 107 may select an associated network computing component (hereinafter "NCC") point of presence (hereinafter "POP") such as NCC POP 142 to service the browse session request. The selection of the NCC POP may determine the processing and network resources available to the instantiated virtual machine. The selection of processing and network resources and the provisioning of software at the NCC POP instance may be done, at least in part, in order to optimize communication with content providers 104 and client computing devices 102. Once the network computing provider 107 has selected a particular NCC POP 142, the network computing provider 107 can initiate a new (or continued) browse session request.

Figure 3:
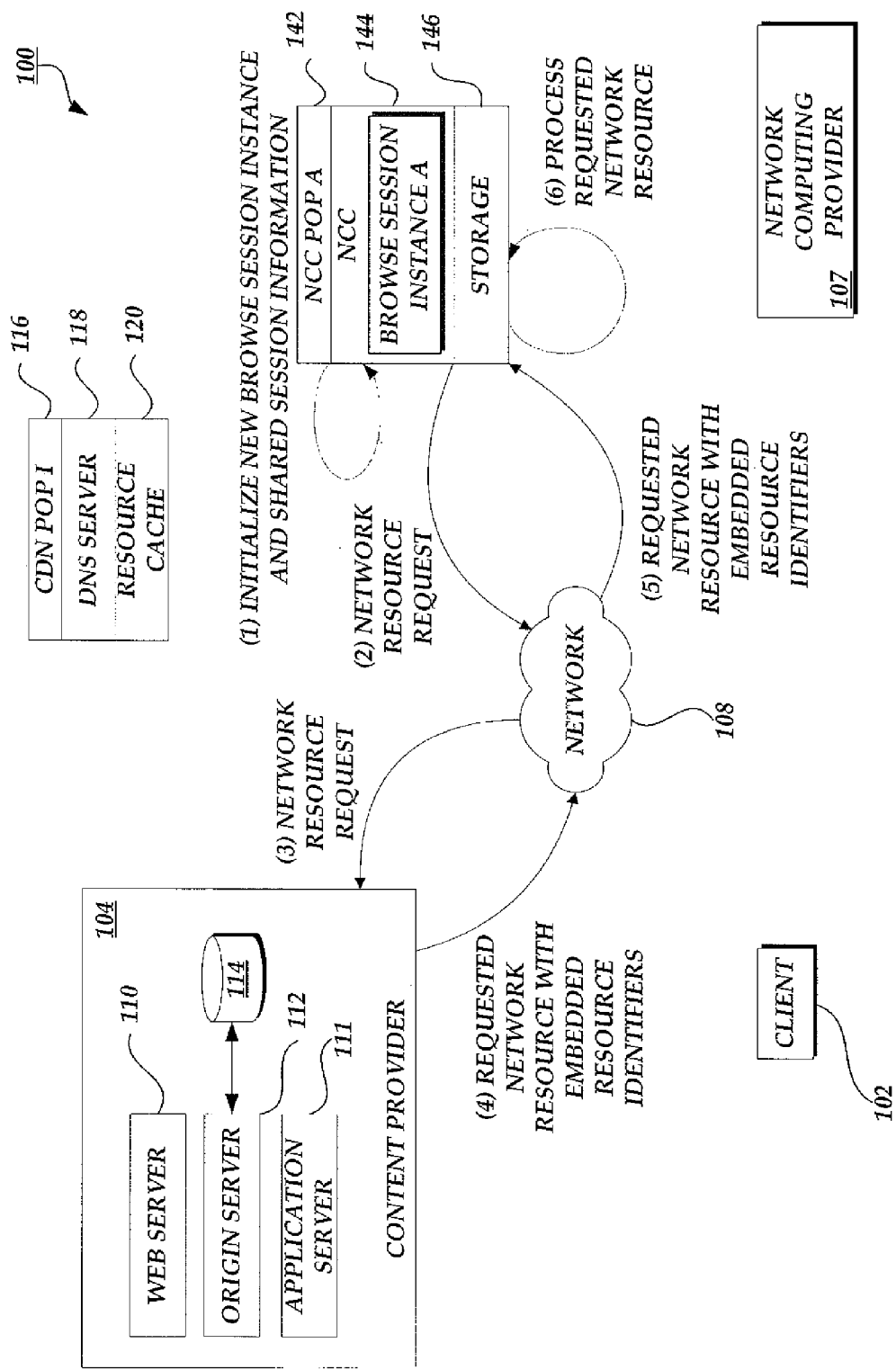
FIG. 3 is a block diagram of the content delivery environment of FIG. 1 illustrating the generation and processing of a request for a network resource from a network computing provider to a content provider.

With reference to FIG. 3, an illustrative interaction for generation and processing of a request for a network resource from a network computing provider 107 to a content provider 104 will be described. As illustrated in FIG. 3, the selected NCC POP 142 may generate a browse session corresponding to one or more content providers based on a browse session request, such as the illustrative browse session request depicted in FIG. 2 above. Illustratively, instantiating a new browse session instance may include loading a new virtual machine instance or browser instance at the NCC POP 142, reserving or allocating device memory, storage or cache space, processor time, network bandwidth, or other computational or network resources for the new browse session. Additionally, the NCC POP 142 may initialize shared session information that will capture browser session information beginning with the browse session request.

Subsequent to initializing a new browse session instance, NCC POP 142 may provide a request for a network resource to a content provider 104 based on a network address included in the browse session request. For example, a browse session request may include a URL for a Web page, such as "http://www.example.com/default.htm." NCC POP 142 may resolve the URL to an IP address through a DNS resolver associated with the network computing provider (not shown), and may request the Web page from the content provider 104 at the resolved IP address. In various embodiments, a network resource may be retrieved from any combination of content providers, content delivery network (hereinafter "CDN") servers, or data stores associated with the network computing provider 107. For example, the network computing provider may check if a resource is stored in a local cache or in another server or service provider associated with the network computing provider 107. If a network resource is stored in a local or associated location, the NCC POP 142 may retrieve the network resource from the local or associated location rather than from the third party content provider 104 or CDN service provider 106. Illustratively, the NCC POP 142 may provide requests for any number of network resources as included in the browse session request, and may obtain these network resources from any number of different sources, sequentially or in parallel.

As illustrated in FIG. 3, the content provider 104 receives the resource request from the NCC POP 142 and processes the request accordingly. In one embodiment, the content provider 104 processes the resource request as if it were originally provided by the client computing device 102. For example, the content provider 104 may select the type of content, ordering of content, or version of content according to the requirements of the requesting client computing device 102. In another embodiment, the content provider 104 may be provided with information that provides information associated with the NCC POP 142 for utilization in providing the requested content (e.g., an available amount of processing resources or network bandwidth).

Subsequent to obtaining the requested network resource from the content provider 104 (or other source designated by the content provider), the NCC POP 142 may process the network resource to extract embedded resource identifiers and gather information for determination of a client remote session browse configuration. For example, a network resource such as a Web page may include embedded CSS style information and Javascript as well as embedded resource identifiers to additional resources such as text, images, video, audio, animation, executable code, and other HTML, CSS, and Javascript files. In the process of extracting the embedded resource identifiers, the NCC POP 142 may gather information about the processed network resources for later use in the determination of a client remote session browse configuration as discussed below with reference to FIG. 4.

Figure 4:
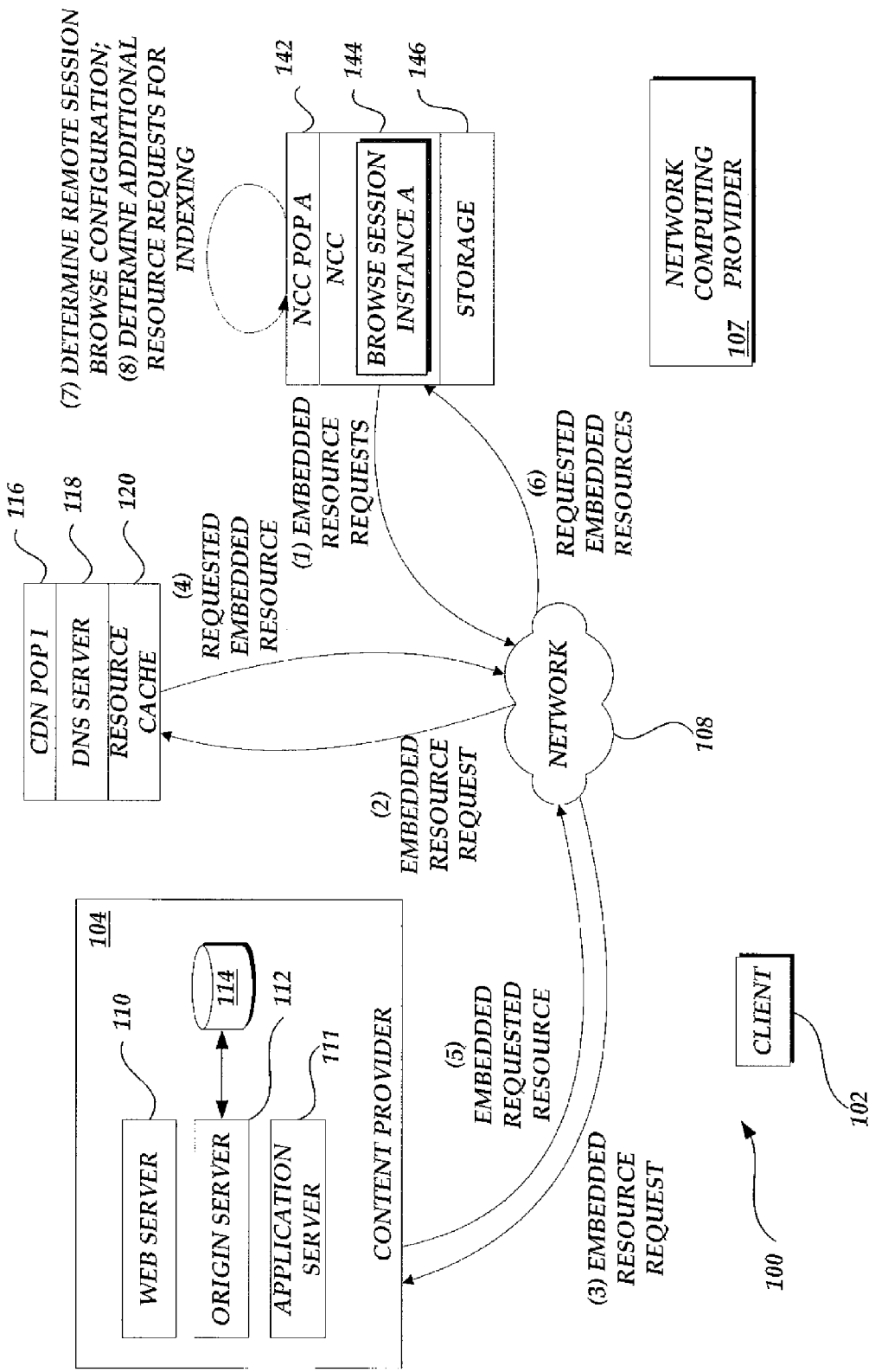
FIG. 4 is a block diagram of the content delivery environment of FIG. 1 illustrating the generation and processing of one or more requests corresponding to one or more embedded resources from a network computing provider to a content provider and content delivery network.

With reference to FIG. 4, an illustrative interaction for generation and processing of one or more requests corresponding to one or more embedded resources from a network computing provider to a content provider and content delivery network is disclosed. As illustrated in FIG. 4, the selected NCC POP 142 may provide resource requests to one or more sources of content such as content provider 104 and CDN POP 116. The resource requests may correspond to embedded resources based on one or more embedded resource identifiers extracted from a requested network resource (e.g., a Web page) as described in FIG. 3 above. In various embodiments, embedded resources may be retrieved from any combination of content providers, CDN servers, or data stores associated with the network computing provider 107.

For example, the network computing provider may check if an embedded resource is stored in a local cache or in another data store or service provider associated with the network computing provider 107. If an embedded resource is stored in a local or associated location, the NCC POP 142 may retrieve the embedded resource from the local or associated location rather than the third party content provider or CDN. Illustratively, the NCC POP 142 may provide requests for any number of embedded resources referenced by a network resource, and may obtain these embedded resources from any number of different sources, sequentially or in parallel. Subsequent to obtaining the requested resources, the NCC POP 142 may process the resources and requested content to determine a client remote session browse configuration for the processing and communication of content to the client computing device 102. The NCC POP 142 may further identify references in any of the retrieved content and determine any additional resource requests for retrieval and caching at the offline browse storage component.

With reference to FIG. 5, an illustrative interaction for generation and processing of an offline content representation, browse session data, and user interaction data between a network computing provider and client computing device is disclosed. As previously described, in one embodiment, the respective browsers on the instantiated network computing component and the client computing device 102 can exchange browsers' session information, such as client remote session browse configuration information, related to the allocation and processing of the requested resources at the instantiated network computing component and client computing device.

As illustrated in FIG. 5, the selected NCC POP 142 may generate initial processing results based on the client and offline remote session browse configuration information as discussed above. If the client and offline remote session browse configuration information each specify different formats or processing of processing results, the selected NCC POP 142 may generate two different processing results. Illustratively, a processing results generated based on the offline remote session browse configuration may be referred to as offline content representation. The NCC POP 142 may provide the processing results generated according to the offline remote session browse configuration information (i.e., the offline content representation) to the identified offline browse storage component. Illustratively, the offline browse storage component may be implemented as part of the client computing device 102 or may include any other network storage location or component accessible to the client computing device.

The selected NCC POP 142 may provide an initial processing result to the client computing device 102 over the network 108. The initial processing result may correspond to requested network content, such as a Web page, along with associated embedded resources processed by the NCC POP 142 in accordance with a selected client remote session browse configuration as described in FIG. 4 above. Additionally, NCC POP 142 can also provide the remote session browse configuration information that will be maintained by the offline browse storage component. The NCC POP 142 also makes a determination of which additional processes will be conducted at the NCC POP 142, at the client computing device 102, or both.

Subsequent to receiving an initial processing result, the remote session browse configuration information, and the allocation of processes, the client computing device 102 may perform any remaining processing actions on the initial processing result as required by the selected client remote session browse configuration, and may display the fully processed content in a content display area of a browser. The client computing device 102 may process any local user interactions with local interface components or content elements locally, and may provide user interactions requiring remote processing to the network computing provider 107. The network computing provider 107 may provide updated processing results to the client computing device in response to changes to the content or remote user interaction data from the client computing device.

With reference to FIG. 6, a block diagram of the content delivery environment of FIG. 1 illustrating the generation and processing of an additional new browse session request from a client computing device to a network computing provider is disclosed. As illustrated in FIG. 6, a second new browse session request may be sent to network computing provider 107 from client computing device 102 across network 108. In an illustrative embodiment, the network computing provider 107 utilizes a registration API to accept browse session requests from the client computing device 102.

The additional browse session request may be generated by a client computing device 102 in response to a user opening up a new browser window with a new content display area, opening a new content display area in an existing browser window (e.g., opening a new tab in a browser), requesting new network content in an existing content display area (e.g., following a link to a new network resource, or entering a new network address into the browser), or any other user interaction. For example, a user browsing a first Web page corresponding to a first browse session instance may follow a link that opens a new tab or browser window to view a second Web page. In one embodiment, any required steps of obtaining and processing content associated with the second Web page may be performed by the currently instantiated network computing component in which the browser can handle the processing of both resource requests.

In another embodiment, the client computing device 102 request may be processed as a new browse session request to the network computing provider 107, including the network address of the second Web page. In this embodiment, the browser on the client computing device may not specifically request a separate browse session, and a user's interaction with the browser on the client computing device 102 may appear to be part of a same browsing session. As described above with regard to FIGS. 2 and 3, the network computing provider 107 may cause an instantiation of a network computing component for obtaining and processing content associated with the second web page. In other embodiments, a new browse session request may be generated by the client computing device 102 corresponding to sections of a network resource (e.g., frames of a Web page), individual network resources, or embedded resources themselves, data objects included in a set of content, or individual network resources.

Illustratively, the additional browse session request may include any number of pieces of data or information including, but not limited to, information associated with a user, information associated with the client computing device 102 (e.g., hardware or software information, a device physical or logical location, etc.), information associated with the network 108, user or browser preferences (e.g., a requested remote session browse protocol, a preference list, a decision tree, or other information), information associated with the network computing provider 107, information associated with one or more pieces of requested network content (e.g., the network address of a network resource), etc. Requested content may include any manner of digital content, including Web pages or other documents, text, images, video, audio, executable scripts or code, or any other type of digital resource.

Subsequent to the receipt of the browse session request, the network computing provider 107 may select an associated network computing component such as NCC POP 142 to service the browse session request. As discussed above with reference to FIG. 2, a network computing provider 107 may select an NCC POP to service a browse session request based on any number of factors, including, but not limited to, available NCC POP resources (e.g., available memory, processor load, network load, etc.), a financial cost of servicing the browse session request at the NCC POP, the NCC POP location respective to a client computing device 102, content provider 104, or CDN POP 116, an NCC POP cache status (e.g., whether a requested resource is already stored in an NCC POP cache or data store), etc. In one embodiment, the network computing provider 107 may select a number of NCC POPs to service a browse session request.

Illustratively, although the network computing provider 107 is depicted here, for purposes of illustration, as selecting NCC POP 142, the network computing provider 107 may select any extant NCC POP to service the browse session request. For example, a single client computing device 102 may simultaneously or sequentially provide three different browse session requests to the network computing provider 107 corresponding to different network resources. The network computing provider 107 may select different NCC POPs for each browse session request, the same NCC POP for all three browse session requests, or any combination thereof. As discussed above, the decision whether to select a different NCC POP than was utilized for a previous or simultaneous browse session request may be made on the basis of available system resources, randomly, or according to any other factor as discussed above and with regard to FIG. 2. Additionally, the NCC POP 142 can update any collected shared session information or transmit the additional browse request to a shared session manager component 154 (not depicted).

With reference to FIGS. 7 and 8, an alternative embodiment in which a network computing provider 107 is not utilized to process resource requests or manage shared session information is depicted. With reference to FIG. 7, the client computing device 102 can transmit a resource request directly to a content provider 104. Additionally, client computing device 102 can transmit the network resource request (or information associated with the network resource request) to the shared session manager component 154. In a further embodiment, the client computing device 102 may also provide the functionality of the shared session manager component 154, omitting the need for transmission of the network resource request. Upon receipt of the network request, the shared session manager component 154 can initialize shared session information based on the network resource request. Referring to FIG. 8, the shared session manager component 154 can update the shared session information based on additional network requests generated by the client computing device 102.

Figure 9:
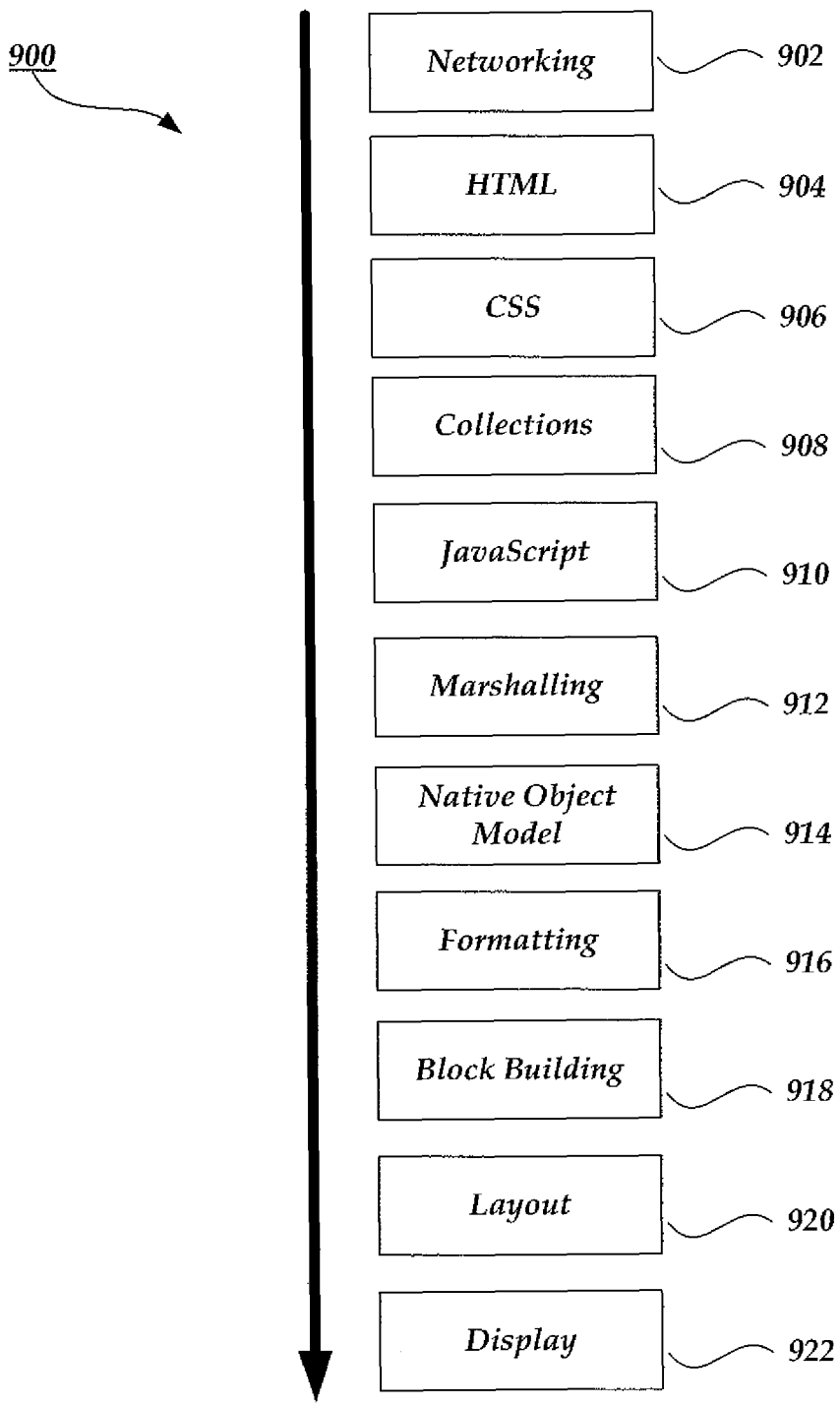
FIG. 9 is a diagram depicting illustrative browser content processing actions as a series of processing subsystems.

FIG. 9 is a diagram depicting illustrative browser content processing actions as a series of processing subsystems 900. In many embodiments, a browser may process sets of content (e.g., network resources such as web pages and associated embedded resources) in a series of processing actions. Illustratively, and as described above with reference to FIGS. 3-5, a client or offline remote session browse configuration may specify a split between processing actions performed at a network computing provider (e.g., an NCC POP) and processing actions performed at a client computing device 102. This split may designate some processing actions to be performed by each of the NCC POP and client computing device 102, or may assign all processing actions to a single device or component. For example, an NCC POP may perform all of these various processing actions at the browse session instance, and send fully processed RDP processing results to the client computing device 102 for bitmap assembly and display. Illustratively, a single browse session instance may have different or the same client and offline remote session browse configurations. Further, any number of different client or offline remote session browse configurations may be used by one or more browse sessions instances running at an NCC POP.

One of skill in the relevant art will appreciate that the subsystems shown here are depicted for the purpose of illustration, and are not intended to describe a necessary order or a definitive list of browser subsystems. Various browser software components may implement additional or fewer browser subsystems than are shown here, and may order the subsystems or corresponding processing actions in any number of different ways. Although the processing subsystems 900 depicted here for purposes of illustration are directed at the processing of Web pages or other Web content, one of skill in the relevant art will appreciate that the processing of other file types or network resources may be broken up in a similar manner. For example, one of skill in the relevant art will appreciate that similar schema may be developed for the processing of images, video, audio, database information, 3d design data, or any other file format or type of data known in the art. Similar schema may also be developed for any number of device operating system or software framework processing operations, such as scheduling, memory or file management, system resource management, process or service execution or management, etc. Further, although the HTML protocol and RDP remote session communication protocols are discussed herein for the purposes of example, one of skill in the relevant art will appreciate that a client or offline remote session browse configuration may implement any number of remote communication protocols for any number of specified processing actions, and that a client or offline remote session browse configuration may be formulated to perform any fraction or combination of the actions identified below at any combination of the client computing device 102 and network computing provider 107.

Illustratively, the first processing subsystem involved in the processing and display of network content is the networking subsystem 902. Illustratively, the networking subsystem 902 may be responsible for all communication between the browser and content provider, including local caching of Web content. The networking subsystem is generally limited by the performance of the user's network. A client or offline remote session browse configuration that splits processing actions at the networking subsystem 902 might include a client or offline remote session browse configuration utilizing an HTML remote session communication protocol, where one or more caching or resource retrieval actions were performed at the NCC POP, but parsing and processing of the content was performed at the client computing device.

As network resources such as HTML documents are downloaded from the server they may be passed to an HTML subsystem 904 which parses the document, initiates additional downloads in the networking subsystem, and creates a structural representation of the document. Modern browsers may also contain related subsystems which are used for XHTML, XML and SVG documents. A client or offline remote session browse configuration that splits processing actions at the HTML subsystem 904 might include a client or offline remote session browse configuration utilizing an HTML remote session communication protocol, where an initial HTML page is processed at the NCC POP in order to extract embedded resource identifiers, but additional parsing and processing of the content is performed at the client computing device. In another embodiment, a client or offline remote session browse configuration that splits processing actions at the HTML subsystem 904 might perform initial processing to create the structural representation of the HTML document, and provides a processing result including the structural representation and associated embedded resources.

When CSS is encountered, whether inside an HTML document or an embedded CSS document, it may be passed to a CSS subsystem 906 to parse the style information and create a structural representation that can be referenced later. Illustratively, a remote session browse configuration that splits processing actions at a CSS subsystem 906 may construct a processing result including the CSS structural representation and HTML structural representation, optionally including any associated embedded resources.

HTML documents often contain metadata, for example the information described in a document header or the attributes applied to an element. The collections subsystem 908 may be responsible for storing and accessing this metadata. A client or offline remote session browse configuration that splits processing actions at a collections subsystem 908 may construct a processing result including processed metadata along with any other structural representations discussed above, optionally including any associated embedded resources.

When Javascript is encountered, it may be passed directly to a JavaScript subsystem 910 responsible for executing the script. The JavaScript subsystem 910 has been examined fully over the years, and may be one of the most well known browser subsystems in the art. A client or offline remote session browse configuration that splits processing actions at a Javascript subsystem 910 may construct a processing result including an internal representation of one or more Javascript scripts, including, but not limited to, state data or a representation of the script in a native or intermediate form, as well as any other processed structures or data discussed above, optionally including any associated embedded resources.

Because many JavaScript engines are not directly integrated into the browser, there may be a communication layer including the marshalling subsystem 912 between the browser and the script engine. Passing information through this communication layer may generally be referred to as marshalling. A client or offline remote session browse configuration that splits processing actions at a marshalling subsystem 912 may construct a processing result including marshalling data as well as any other processed structures, scripts, or data discussed above, optionally including any associated embedded resources.

In some embodiments, JavaScript interacts with an underlying network resource such as a Web document through the Document Object Model APIs. These APIs may be provided through a native object model subsystem 914 that knows how to access and manipulate the document and is the primary interaction point between the script engine and the browser. Illustratively, a client or offline remote session browse configuration that splits processing actions at a native object model subsystem 914 may construct a processing result including native object model state data or API calls as well as any other processed structures, scripts, or data discussed above, optionally including any associated embedded resources.

Once the document is constructed, the browser may needs to apply style information before it can be displayed to the user. The formatting subsystem 916 takes the HTML document and applies styles. Illustratively, a client or offline remote session browse configuration that splits processing actions at a formatting subsystem 916 may construct a processing result including an HTML representation with applied styles, as well as any other processed state data, API calls, structures, scripts, or data discussed above, optionally including any associated embedded resources.

In one embodiment, CSS is a block based layout system. After the document is styled, the next step, at a block building subsystem 918, may be to construct rectangular blocks that will be displayed to the user. This process may determine things like the size of the blocks and may be tightly integrated with the next stage, layout. A client or offline remote session browse configuration that splits processing actions at a block building subsystem 918 may construct a processing result including block information, as well as any other processed state data, API calls, structures, scripts, or data discussed above, optionally including any associated embedded resources.

Subsequent to the browser styling the content and constructing the blocks, it may go through the process of laying out the content. The layout subsystem 920 is responsible for this algorithmically complex process. Illustratively, a client or offline remote session browse configuration that splits processing actions at a layout subsystem 920 may process the various state data, API calls, structures, scripts, or data discussed above to construct a processing result including layout information for the client computing device. Illustratively, an NCC POP may make use of various data or settings associated with the client computing device or browser (e.g., as provided in the initial browse session request) in order to generate a suitable layout for the client computing device. For example, a mobile device may provide a screen resolution and a display mode to the NCC POP. The NCC POP may base layout calculations on this screen resolution and display mode in order to generate a processing result corresponding to a content representation suitable for a browser running on the mobile device. Illustratively, in various embodiments, any other subsystem implemented by the NCC POP may make use of data associated with the client computing device or browser in generating a processing result for the client.

The final stage of the process may occur inside the display subsystem 922 where the final content is displayed to the user. This process is often referred to as drawing. A client or offline remote session browse configuration that splits processing actions at the networking subsystem 902 might include a client or offline remote session browse configuration utilizing an RDP remote session communication protocol, where nearly all processing is performed at the NCC POP, and a processing result including bitmap data and low level interface data are passed to the client computing device for display.

Figure 10:
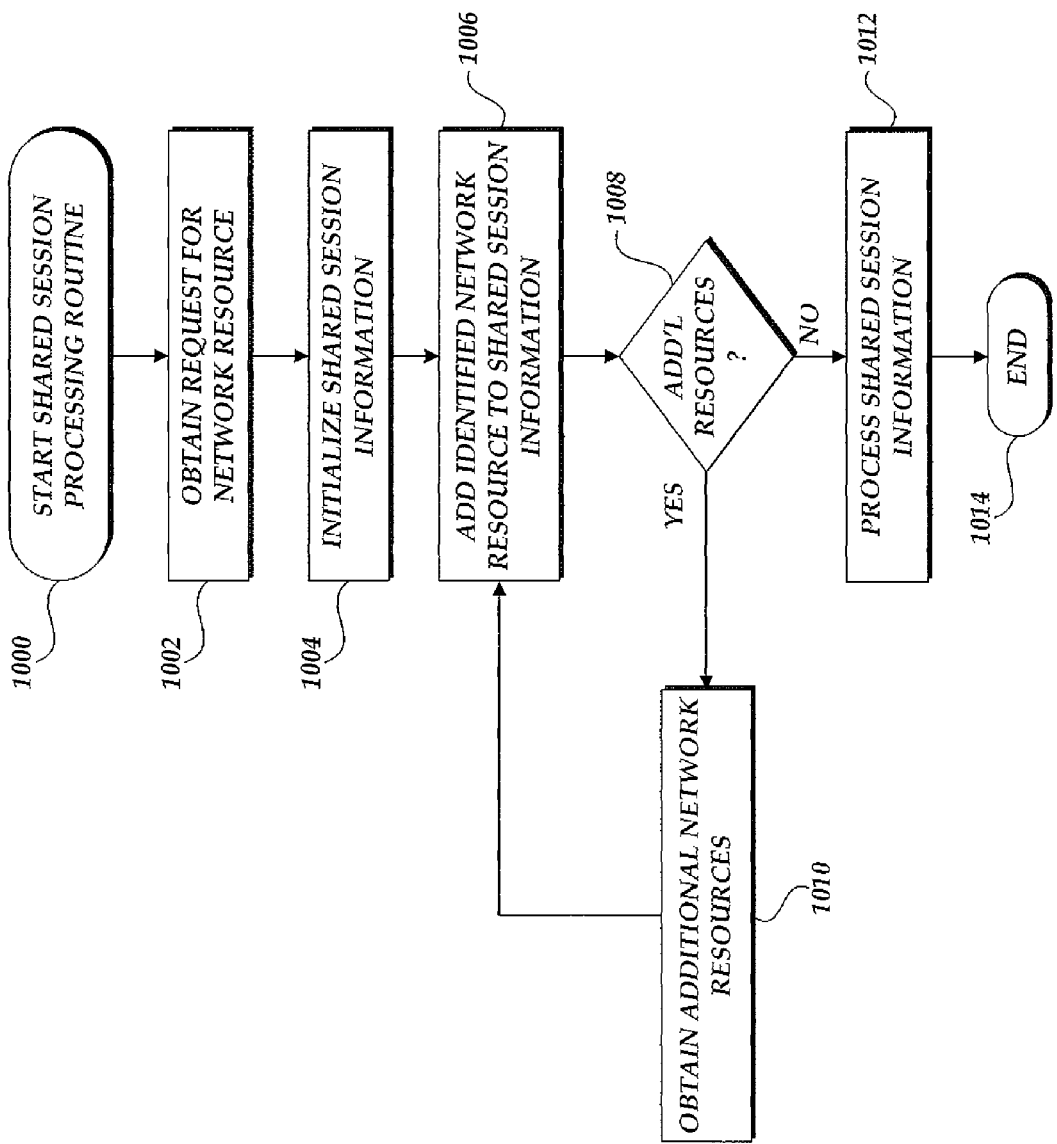
FIG. 10 is a flow diagram illustrative of a shared session processing routine implemented by a client computing device.

FIG. 10 is a flow diagram illustrative of a shared session information routine 1000 implemented by network computing provider 107 or shared session manager component 154. For purposes of illustration, however, routine 1000 will be described as being implemented by the shared session manager component 154. At block 1002, the shared session manager component 154 obtains a request for a network resource. In one embodiment, the request for the resource can be a browser session request initiated by the client computing device 102 and directed toward the network computing provider 107. Alternatively, the request for the resource can be a copy of a network resource request transmitted by the client computing device 102 to a content provider (or other service provider) or information extract from such a network resource request.

At block 1004, the shared session manager component 154 initializes shared session information. Illustratively, the initialization of shared session information can based on default criteria or user specified information, such as naming convention, storage location, access preferences, and the like. In another embodiment, the shared session manager component 154 can access previously existing shared session information. For example, the shared session manager component 154 can access shared session information previously created by the same individual or a different individual. In a further embodiment, the shared session manager component 154 can obtain shared session information as part of the request for the network resource submitted by the client computing device 102. The shared session manager component 154 can use the shared session information to add to the previously existing shared session information or to create new shared session information incorporating the additional information.

At block 1006, the shared session manager component 154 adds one or more network resources associated with the request for network resources to the initialized shared session information. Illustratively, the addition of network resources includes not only the identification of the requested network resource, but also browsing session information related to the browsing path (or other information). Illustratively, the browsing information can include information such as navigation path information, such as the order in which network resources were accessed. The browsing information can also include metadata provided during the browsing session, such as annotations, performance data or measurements, timing information, and the like.

At decision block 1008, a test is conducted to determine whether additional resources are to be added. In one embodiment, the shared manager component will maintain shared session information based on various criteria, such as time based criteria, a number of resources included in the shared session information (in terms of maximums or minimums), user actions (e.g., closing of a browser), and the like. If there are additional network resources, at block 1010, the shared session manager component 154 obtains the additional network resource requests and the routine 100 returns to block 1006 to add the additional requested resources to the shared session information.

Referring again to decision block 1008, once no additional resources exist or will be added to the shared session information, at block 1012, the shared session manager component 154 processes the shared session information. In one aspect, the shared session manager component 154 can apply create shared session identifiers based on various naming conventions. For example, the shared session manager component 154 can create readily discernable shared session identifiers based on the network resources associated with the shared session identifier. In another aspect, the shared session manager component 154 can process the resources identified in the shared session information to manage the network resources or browse session information included in the shared session information. For example, the shared session manager component 154 can filter duplicate entries, remove one or more network resources that have been identified in blacklist, and the like. In another example, the shared session manager component 154 can combine at least portions of two or more shared session information sets.

In still another aspect, the shared session manager component 154 can publish or otherwise transmit created shared session identifiers. For example, the shared session manager component 154 can facilitate the publication of shared session identifiers to social networking Web sites. In a further aspect, the shared session manager component 154 can facilitate the editing and verification of shared session information. An illustrative interface for editing shared session will be described with regard to FIG. 12 (below). In another example, the shared session manager component 154 can publish information or statistics about shared session information to identify network resources or combination of network resources that may be considered trending or popular.

In still a further aspect, the shared session manager component 154 can configure how shared session information will be accessed or subsequently processed. Illustratively, in one embodiment, accessing shared session information can result in each client computing device 102 individually accessing the network resource at the time the shared session information is accessing. In another embodiment, accessing shared session information can result in each client computing device 102 accessing an ongoing or existing browser session information (e.g., a collaborative browser session). In still another embodiment, accessing shared session information can result in each client computing device 102 accessing archived versions of the network resource to recreate the network resources as they were accessed at the time the shared session information was generated or updated. At block 1014, the routine 1000 terminates.

Figure 11:
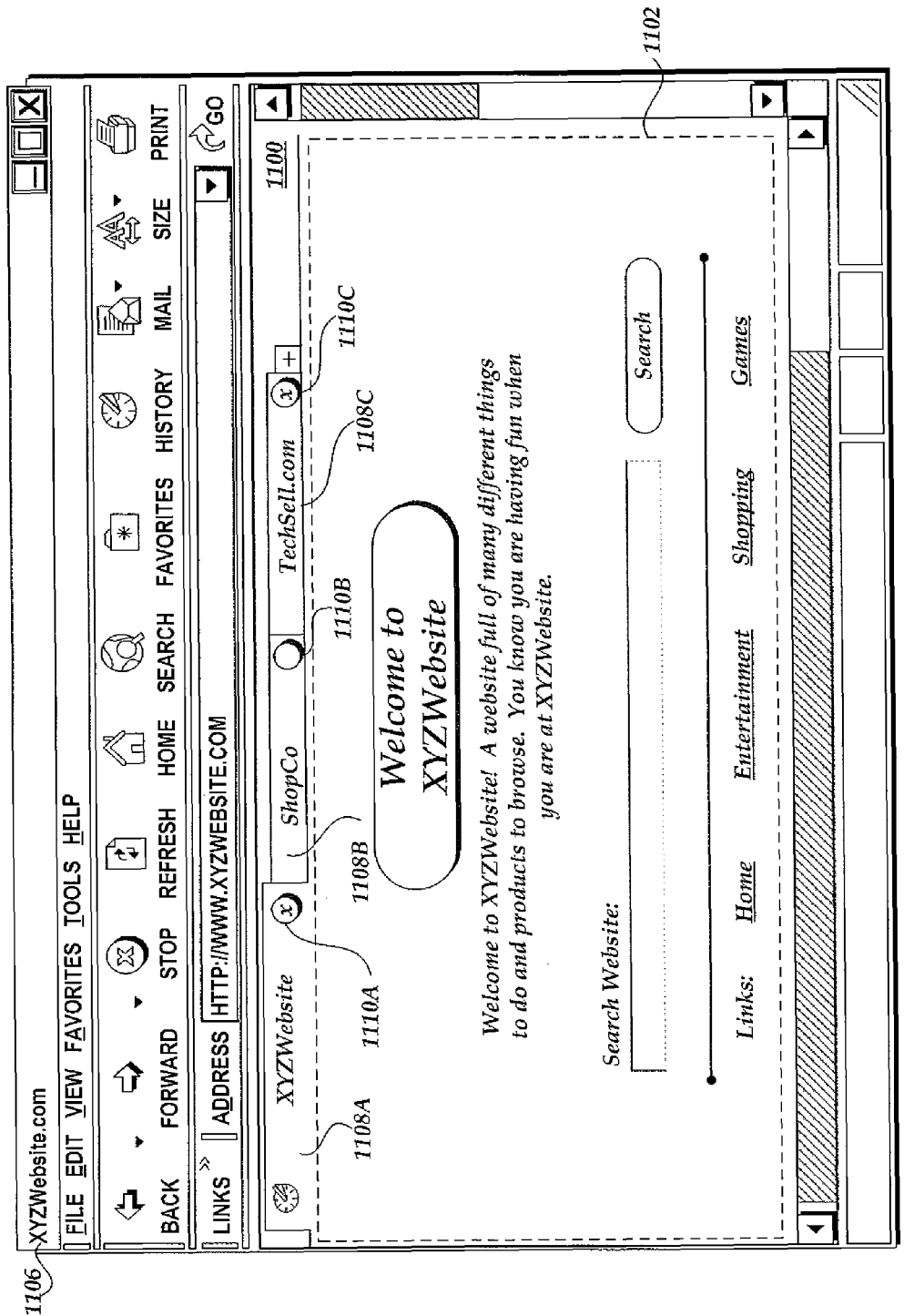
FIG. 11 is a user interface diagram depicting an illustrative browser interface and display of browse session content.

FIG. 11 is a user interface diagram depicting an illustrative browser interface and display of browse session content. As described above with reference to FIG. 5, a browser 600 may have a content display area 1102, as well as one or more one or more local interface components. These local interface components may include toolbars, menus, buttons, address bars, scroll bars, window resize controls, or any other user interface controls. Illustratively, local interface components may be displayed as separate from the content display area or may be overlaid or embedded in the content display area.

Interactions with local interface components may be treated as local user interactions or remote user interactions depending on the processing required by the interaction and the client remote session browse configuration. For example, the selection of a preferences option in a browser menu may be handled entirely as a local user interaction by a browser. The processing required to display the menu, provide visual feedback regarding the selection, display the preferences window, and process the changes made to the browser preferences may be performed locally. As discussed above, processing user interactions locally may provide greater responsiveness at the browser as opposed to sending user interaction data to the NCC POP 142 for processing. As another example, when using a client remote session browse configuration that specifies extensive processing on the NCC POP 142 (e.g., a client remote session browse configuration using a remote session communication protocol such as RDP), the selection of a content refresh button in a browser toolbar may be handled both as a local user interaction and a remote user interaction. The limited processing required to provide interface feedback corresponding to the button selection may be handled at the client computing device 102 in order to provide the appearance of interface responsiveness, while the refresh command, which may require processing of the network content displayed in the content display area of the browser, may be sent as user interaction data to the NCC POP 142 for processing. The NCC POP 142 may then transmit updated processing results corresponding to the refreshed network content back to the client computing device 102 for display.

Illustratively, the browser 1100 may include one or more content display areas 1102 organized in content tabs 1108A-C. Illustratively, a content display area 1102 may display a representation of content corresponding to a processing result provided by an NCC POP 142 as the result of a live browsing session, or may display a representation of content corresponding to an offline content representation. Tabs 1108A-1108C also include controls 1110 A-1110C for allowing a user to designate which currently accessed network resource should be included in shared session information. Illustratively, a browser 1100 may include any number of other controls not shown herein, but associated with the viewing, processing, or maintenance of an offline content representation.

Figure 12:
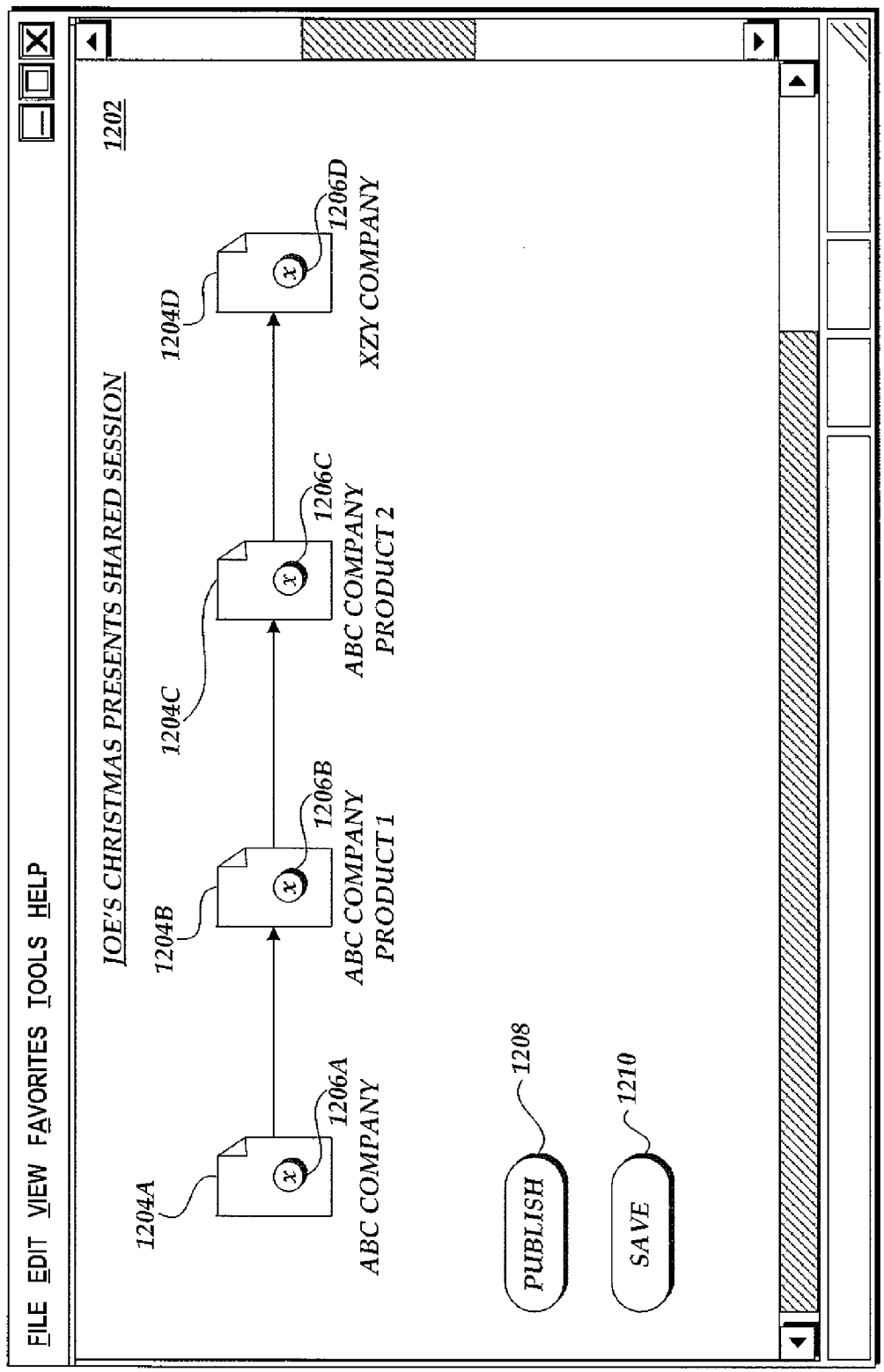
FIG. 12 is a user interface diagram depicting an illustrative browser interface for managing shared session information.

FIG. 12 is a user interface diagram depicting an illustrative browser interface 1200 for managing shared session information. As illustrated in FIG. 12, the browser interface 1200 includes a display area 1202 depicting display objects 1204A-1206D corresponding to network resources included in shared session information. Illustratively, the display objects 1204A-1204D are depicting in an order or with identifiers that correspond to the browser session information. Additionally, each display object 1204A-1204D includes controls 1206A-1206D for allowing the removal of the display object (and its corresponding network resource) from the shared session information.

Browser interface 1200 can further include additional controls to facilitate the further processing of the shared session information. As also illustrated in FIG. 12, the browser interface 1200 can include a first control 1208 for publishing the shared session information. Additionally, the browser interface 1200 can include a control 1210 for saving the shared session information. One skilled in the relevant art will appreciate that additional or alternative depictions or controls may also be incorporated into the browser interface 1200.

Figure 13:
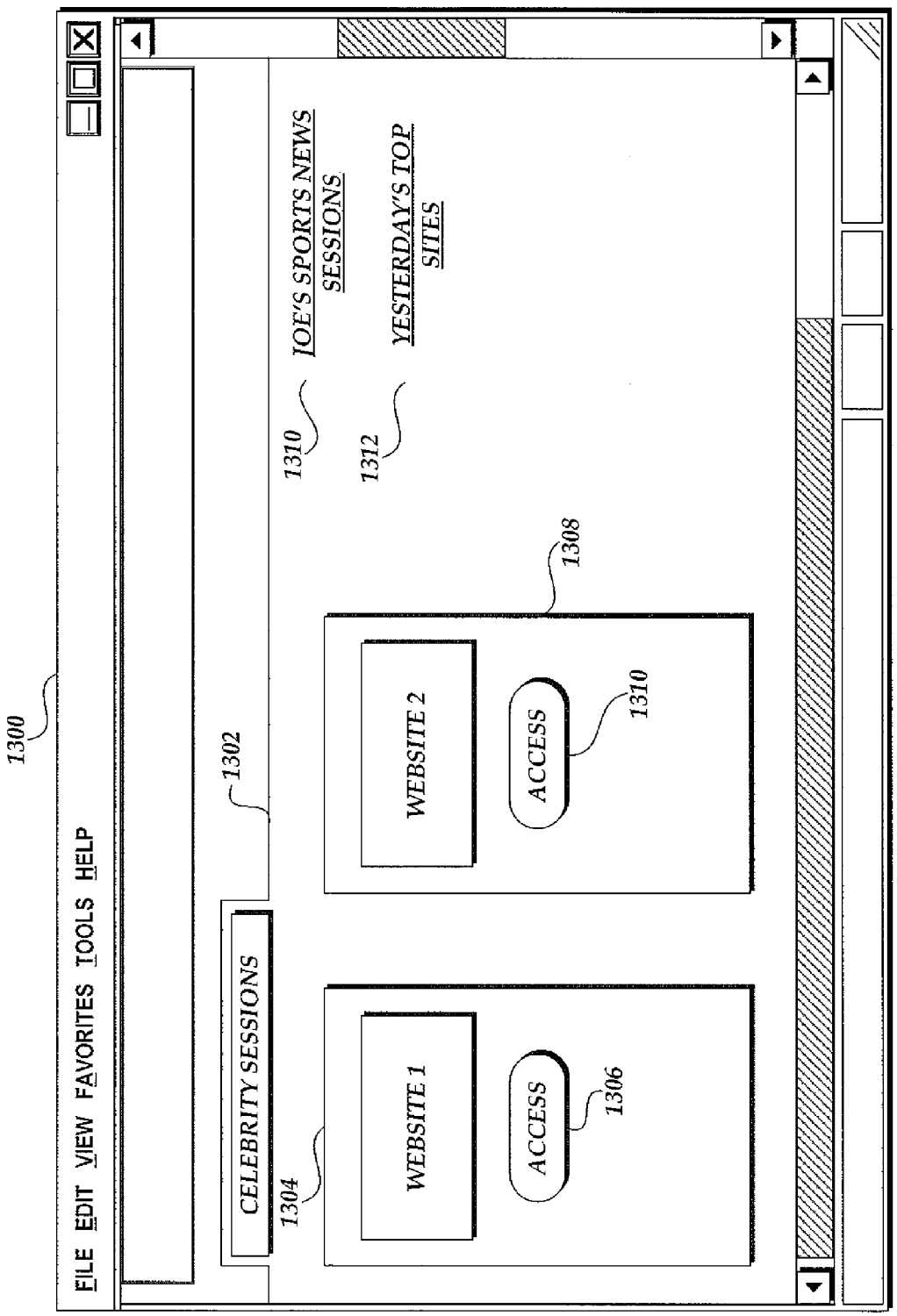
FIG. 13 is a user interface diagram depicting an illustrative browser interface for obtaining shared session information.

FIG. 13 is a user interface diagram depicting an illustrative browser interface 1300 for accessing shared session information. As illustrated in FIG. 13, the browser interface 1300 includes a display area 1202 depicting display objects 1302 and 1306 corresponding to network resources included in shared session information. Illustratively, the display objects 1302 and 1306 are depicted in an order or with identifiers that correspond to the browser session information. In one embodiment, the display objects 1302 and 1306 may correspond to reduce size images for providing a user with a preview of the content, often referred to as a thumbnail image. In another embodiment, the display objects 1302 and 1306 can correspond to a representation of the content included in the shared session information. Additionally, each display object 1302 and 1306 includes controls 1304 and 1308 for accessing the network resources, accessing more of a network resource or enlarging the display of a selected network resource. Still further, the display area 1302 may only display a subset of the network resources that have been identified in the shared session information.

With continued reference to FIG. 13, the display area 1302 can also include additional selectable identifiers 1310 and 1312 that may correspond to additional shared session information. In one embodiment, the additional selectable identifiers may have originated from the same author as the currently accessed shared session information. In another example, the additional selectable identifiers may correspond to recommended shared session information based on a user's previous access of shared session information. In a further example, the additional selectable identifiers may correspond to trending or popular shared session information.

Although the accessed shared session information is depicted in FIG. 13 as being represented in a single tabbed view, one skilled in the relevant art will appreciate that one or more network resources may be represented in different tabbed views. Still further, one skilled in the relevant art will appreciate that the size, orientation and content in the display area 1302 may be dynamically or manually configured based on the device utilized to access the shared session information, available bandwidth, and the like.

While illustrative embodiments have been disclosed and discussed, one skilled in the relevant art will appreciate that additional or alternative embodiments may be implemented within the spirit and scope of the present invention. For example, the techniques described herein may be utilized, without departing from the scope of the present invention, to allow remote processing management in any number of other software applications and processes, including, but not limited to, image or video editing software, database software, office productivity software, 3d design software, audio and sound processing applications, etc. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with the scope of variations to the present disclosure.

Conditional language, such as, among others, "can," "could," "might," or "may," unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments, or that one or more embodiments necessarily include logic for deciding, with or without user input or prompting, whether these features, elements or steps are included or are to be performed in any particular embodiment.

Any process descriptions, elements, or blocks in the flow diagrams described herein or depicted in the attached figures should be understood as potentially representing modules, segments, or portions of code which include one or more executable instructions for implementing specific logical functions or steps in the process. Alternate implementations are included within the scope of the embodiments described herein, in which elements or functions may be deleted, executed out of order from that shown or discussed, including substantially concurrently or in reverse order, depending on the functionality involved, as would be understood by those skilled in the art. It will further be appreciated that the data or components described above may be stored on a computer-readable medium and loaded into memory of the computing device using a drive mechanism associated with a computer readable medium storing the computer executable components such as a CD-ROM, DVD-ROM, or network interface; further, the component or data can be included in a single device or distributed in any manner. Accordingly, general purpose computing devices may be configured to implement the processes, algorithms, and methodology of the present disclosure with the processing or execution of the various data or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method for remote session browsing comprising:
    obtaining, by a network computing component, a first network resource from a content provider based on a first browse session request from a client-based browser application hosted at a client computing device;
    determining, by the network computing component, a remote session browsing configuration associated with the first network resource, wherein the remote session browsing configuration identifies a subset of a plurality of processing actions to be performed at the network computing component for displaying the first network resource at the client computing device;
    processing, by a network-based browser application hosted at the network computing component, the first network resource to generate a processing result corresponding to the determined remote session browsing configuration,
    wherein the processing result corresponds to a representation of the first network resource, and
    wherein the processing result is generated by performing, by the network-based browser application hosted at the network computing component, the subset of the plurality of processing actions identified by the remote session browsing configuration;
    providing, by the network computing component, the processing result to the client computing device, wherein the client computing device is configured to perform, by the client-based browser application, at least one of the plurality of processing actions which was not performed by the network-based browser application for displaying the first network resource at the client computing device; and
    providing, by the network computing component, a shared session information which comprises information to identify the first network resource and browse session information associated with the first network resource, wherein the browse session information comprises at least part of information communicated between the network-based browser application and the client-based browser application in accordance with the remote session browsing configuration; and
    receiving a second browse session request from the client-based browser application, the second browse session request including at least a request for the first network resource, wherein the second browse session request is based, at least in part, on the shared session information, and wherein at least one network resource requested in the second browse session request is not requested in the first browse session request.

2. The computer-implemented method of claim 1, wherein the remote session browsing configuration is a client remote session browsing configuration or an offline remote session browsing configuration, and wherein a communication protocol identified by the client remote session browsing configuration is different from a communication protocol identified by the offline remote session browsing configuration.

3. The computer-implemented method of claim 2, wherein at least one of the communication protocol identified by the client remote session browsing configuration and the communication protocol identified by the offline remote session browsing configuration includes an HTML protocol, a Remote Desktop protocol, a Virtual Network Computing protocol, a Remote Frame Buffer protocol, or an X-Windows protocol.

4. The computer-implemented method of claim 1, wherein providing the shared session information includes publishing a shared session identifier, the shared session identifier accessible by a plurality of client computing devices.

5. The computer-implemented method of claim 1, wherein the shared session information corresponds to an identifier, the identifier based on identifiers associated with a plurality of network resources accessed by the client computing device.

6. A system for remote session browsing comprising:
    one or more computer processors;

at least one computer memory accessible by at least one of the one or more computer processors;

a network computing component comprising an executable software module executed by the one or more computer processors, wherein the network computing component is operable to:

obtain a first request for a first network resource from a client-based browser application hosted at a client computing device;

determine a remote session browsing configuration associated with the first network resource, wherein the remote session browsing configuration identifies a subset of a plurality of processing actions to be performed at the network computing component for displaying the first network resource at the client computing device;

cause a network-based browser application hosted at the network computing component to process the first network resource to generate a processing result corresponding to the determined remote session browsing configuration, wherein the processing result corresponds to a representation of the first network resource, and wherein the processing result is generated by performing, by the network-based browser application hosted at the network computing component, the subset of the plurality of processing actions identified by the remote session browsing configuration;

transmit the processing result to the client computing device in accordance with the remote session browsing configuration, wherein the processing result corresponds to a representation of at least one of the first network resource and content associated with the first network resource to be displayed at the client computing device, wherein the client computing device is configured to perform, by the client-based browser application, at least one of the plurality of processing actions which was not performed by the network-based browser application for displaying the first network resource at the client computing device;

generate shared session information, wherein the shared session information comprises information to identify the first network resource and further comprises browser session information, and wherein the browser session information comprises at least part of information communicated between the network-based browser application and the client-based browser application in accordance with the remote session browsing configuration;

obtain a subsequent request for the first network resource and a second network resource;

in response to the subsequent request, enable a new browsing session for the first network resource and the second network resource based at least in part on the browser session information in the shared session information; and transmit processing results corresponding to the subsequent request to the client computing device, wherein the processing results correspond to the first processing result.

7. The system of claim 6, wherein the client computing device is configured to perform the one or more processing actions identified by the remote session browsing configuration.

8. The system of claim 6, wherein the network computing component is further operable to determine a client remote session browsing configuration, wherein the client remote session browsing configuration identifies a set of processing actions to be performed at the network computing component to generate the processing result.

9. The system of claim 8, wherein the network computing component is further operable to determine the client remote session browsing configuration associated with the network resource based on a resource data format, a resource content type, a resource size, resource processing requirements, resource latency requirements, a number or type of interactive elements, a resource security risk, historical resource usage data, resource usage predictions, an associated user preference, an associated network address, an associated network domain, historical content provider usage data, or content provider configuration data.

10. The system of claim 8, wherein the set of processing actions identified by the client remote session browsing configuration includes at least one shared processing action performed during generation of the representation of content.

11. The system of claim 6, wherein the shared session information is associated with a communication protocol including at least one of an HTML protocol, a Remote Desktop protocol, a Virtual Network Computing protocol, a Remote Frame Buffer protocol, and an X-Windows protocol.

12. The system of claim 6, wherein the network computing component is further operable to determine a second remote session browsing configuration, wherein the second remote session browsing configuration identifies a set of processing actions to be performed at the network computing component to generate one or more content representations corresponding to the first network resource responsive to the subsequent request corresponding to the shared session information.

13. The system of claim 12, wherein the second remote session browsing configuration associated with the subsequent request corresponding to the shared session information is different from a remote session browsing configuration previously associated with the first network resource.

14. A computer-implemented method for remote session browsing comprising:

obtaining, by a network computing component, a request for a first network resource from a client-based browser application hosted at a client computing device;

determining, by the network computing component, a remote session browsing configuration associated with the first network resource, wherein the remote session browsing configuration identifies a subset of a plurality of processing actions to be performed at the network computing component for displaying the first network resource at the client computing device;

processing, by a network-based browser application hosted at the network computing component, the first network resource to generate a processing result corresponding to the determined remote session browsing configuration, wherein the processing result corresponds to a representation of the first network resource, and wherein the processing result is generated by performing, by the network-based browser application hosted at the network computing component, the subset of the plurality of processing actions identified by the remote session browsing configuration;

providing, by the network computing component, the processing result to the client computing device, wherein the client computing device is configured to perform, by the client-based browser application, at least one of the plurality of processing actions which was not performed by the network-based browser application for displaying the first network resource at the client computing device;

generating, by the network computing component, shared session information corresponding to the first network resource, wherein the shared session information includes a first browser session information, wherein the first browser session information comprises at least part of information communicated between the network-based browser application and the client-based browser application in accordance with the remote session browsing configuration;

transmitting, by the network computing component, the shared session information; and in response to a second request corresponding to the shared session information, enabling a new browsing session for at least one of the first network resource and a second network resource based at least in part on corresponding browser session information in the shared session information, wherein the corresponding browser session information comprises at least part of information communicated previously between the network-based browser application and the client-based browser application in accordance with a remote session browsing configuration, and wherein the second request includes at least a request for the second network resource.

15. The computer-implemented method of claim 14 further comprising transmitting a processing result to the client computing device, wherein the processing result corresponds to a representation of at least one of the second network resource and content associated with the second network resource to be displayed at the client computing device.

16. The computer-implemented method of claim 14, wherein transmitting the shared session information includes transmitting a shared session identifier.

17. The computer-implemented method of claim 14, wherein transmitting the shared session information includes publishing a shared session identifier, the shared session identifier accessible by a plurality of client computing devices.

18. The computer-implemented method of claim 14, wherein obtaining the request for the first and second network resource corresponds to obtaining information based on a transmitted request for the first and second network resource.

19. The computer-implemented method of claim 14 further comprising obtaining a request to modify shared session information and modifying information corresponding to at least one of the first or second network resources.

20. The computer-implemented method of claim 14, wherein obtaining the request for the first and second network resource corresponds to obtaining a request responsive to manipulation of a control on an interface.

21. The computer-implemented method of claim 14, wherein generating shared session information corresponding to the first network resource includes accessing previously generated session information.

22. The computer-implemented method of claim 14 further comprising processing the shared session information prior to transmitting the shared session information.

23. The computer-implemented method of claim 22, wherein processing the shared session information includes removing duplicate resources.

24. The computer-implemented method of claim 22, wherein processing the shared session information includes adding at least one resource from shared session information.

* * * * *